US011223270B2

(12) United States Patent
Rajesh et al.

(10) Patent No.: US 11,223,270 B2
(45) Date of Patent: Jan. 11, 2022

(54) POWER-EFFICIENT SYNC-RECTIFIER GATE DRIVER ARCHITECTURE

(71) Applicant: Cypress Semiconductor Corporation, San Jose, CA (US)

(72) Inventors: Karri Rajesh, Visakhapatnam (IN); Arun Khamesra, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/721,377

(22) Filed: Dec. 19, 2019

(65) Prior Publication Data
US 2021/0091675 A1   Mar. 25, 2021

Related U.S. Application Data

(60) Provisional application No. 62/903,548, filed on Sep. 20, 2019.

(51) Int. Cl.
*H02M 3/335* (2006.01)
*H02M 1/00* (2006.01)
*H02M 1/08* (2006.01)
H02M 1/34 (2007.01)
H02J 7/00 (2006.01)

(52) U.S. Cl.
CPC .......... *H02M 1/0029* (2021.05); *H02M 1/08* (2013.01); *H02M 3/33523* (2013.01); *H02M 3/33592* (2013.01); *H02J 7/0045* (2013.01); *H02J 2207/20* (2020.01); *H02M 1/34* (2013.01)

(58) Field of Classification Search
CPC .......... H02M 1/0029; H02M 3/33523
See application file for complete search history.

(56) References Cited

U.S. PATENT DOCUMENTS

| 8,089,784 B2 | 1/2012 | Choi |
| 8,488,355 B2 | 7/2013 | Berghegger |
| 8,520,414 B2 | 8/2013 | Garrity et al. |
| 9,595,877 B2 | 3/2017 | Dai et al. |
| 9,729,062 B2 | 8/2017 | Cummings |

(Continued)

FOREIGN PATENT DOCUMENTS

WO   2017156532 A1   9/2017

OTHER PUBLICATIONS

6ED2230S12T 1200 V Three Phase Gate Driver with Integrated Bootstrap Diode and OCP, Datasheet, infineon, Aug. 5, 2019, 29 pages.

(Continued)

*Primary Examiner* — Alex Torres-Rivera
(74) *Attorney, Agent, or Firm* — Lowenstein Sandler LLP

(57) ABSTRACT

A synchronous switching scheme with adaptive slew control in order to adiabatically charge and discharge a capacitor to recycle charge and generate a boosted voltage on the gate of the synchronous rectifier field effect transistor (FET) is described. In one embodiment, an apparatus includes a synchronous rectifier FET coupled to a transformer, and a secondary-side controller coupled to the synchronous rectifier FET. The secondary-side controller includes a synchronous rectifier gate driver (SRGD) coupled to a gate of the synchronous rectifier FET. The SRGD is to drive the synchronous rectifier FET using the capacitor and an adaptive slew rate, and to adiabatically charge and discharge the capacitor.

17 Claims, 18 Drawing Sheets

(56) References Cited

U.S. PATENT DOCUMENTS

| | | |
|---|---|---|
| 10,008,947 B2 | 6/2018 | Vemuri et al. |
| 10,014,775 B1 | 7/2018 | Assaad et al. |
| 10,250,151 B1 | 4/2019 | Wu |
| 10,250,152 B2 | 4/2019 | Chang et al. |
| 10,374,505 B2 | 8/2019 | Wood |
| 10,516,341 B1* | 12/2019 | Fu .................. H02M 1/08 |
| 10,763,756 B2* | 9/2020 | Mayell ............ H02M 3/33523 |
| 2007/0236976 A1 | 10/2007 | Malik |
| 2007/0253225 A1 | 11/2007 | Baurle et al. |
| 2015/0138839 A1 | 5/2015 | Seok |
| 2015/0365003 A1 | 12/2015 | Sadwick |
| 2016/0268909 A1 | 9/2016 | Liu et al. |
| 2017/0085183 A1 | 3/2017 | Notsch |
| 2018/0358902 A1* | 12/2018 | Duvnjak .......... H02M 3/33507 |
| 2019/0020282 A1* | 1/2019 | Li .................. H02M 1/08 |
| 2019/0089258 A1 | 3/2019 | Giuliano et al. |
| 2019/0097540 A1* | 3/2019 | Gherdovich .......... H01L 24/97 |
| 2019/0131963 A1* | 5/2019 | Gong ................ H03K 17/0424 |
| 2019/0229635 A1 | 7/2019 | Hyugaji et al. |

OTHER PUBLICATIONS

AC-DC Active Clamp Flyback PMW IC, NCP1568, On Semiconductor, 2018 Jan. 2020 (Rev. 1), 44 pages.

Compact Single Channel Isolated Gate Drive Reference Design for UPS and Inverters, TEDUCV0, Texas Instruments, TI Designs, TIDS-01160, Jun. 2017, 41 pages.

Flyback SMPS Using a Microcontroller as Control Unit, AN2122, Microchip Technology Inc., 2016, 73 pages.

Power Solutions Energy-efficient power analog, power discrete, and optoelectronic solutions that maximize energy savings in power sensitive applications, Fairchild Semiconductor, Mouser Electronics, 2010, 61 pages.

UCC28780 High Frequency Active Clamp Flyback Controller, Texas Instruments, Oct. 2017, Feb. 2018 (Revised), 68 pages.

International Search Report for International Application No. PCT/US20/49076 dated Nov. 17, 2020, 2 pages.

Written Opinion of the International Searching Authority for International Application No. PCT/US20/49076 dated Nov. 17, 2020, 6 pages.

* cited by examiner

POWER-EFFICIENT SYNC-RECTIFIER GATE DRIVER ARCHITECTURE

RELATED APPLICATIONS

This application claims the benefit of U.S. Provisional Application No. 62/903,548, filed Sep. 20, 2019, the entire contents of which are incorporated by reference.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents. Under certain power delivery conditions, fault conditions can occur on the provided voltages/currents from the power provider, as well as other fault conditions can occur on the provided voltages/currents received by the power consumer.

BRIEF DESCRIPTION OF THE DRAWINGS

The disclosure is illustrated by way of example, and not of limitation, in the figures of the accompanying drawings.

DETAILED DESCRIPTION

Figure 1:
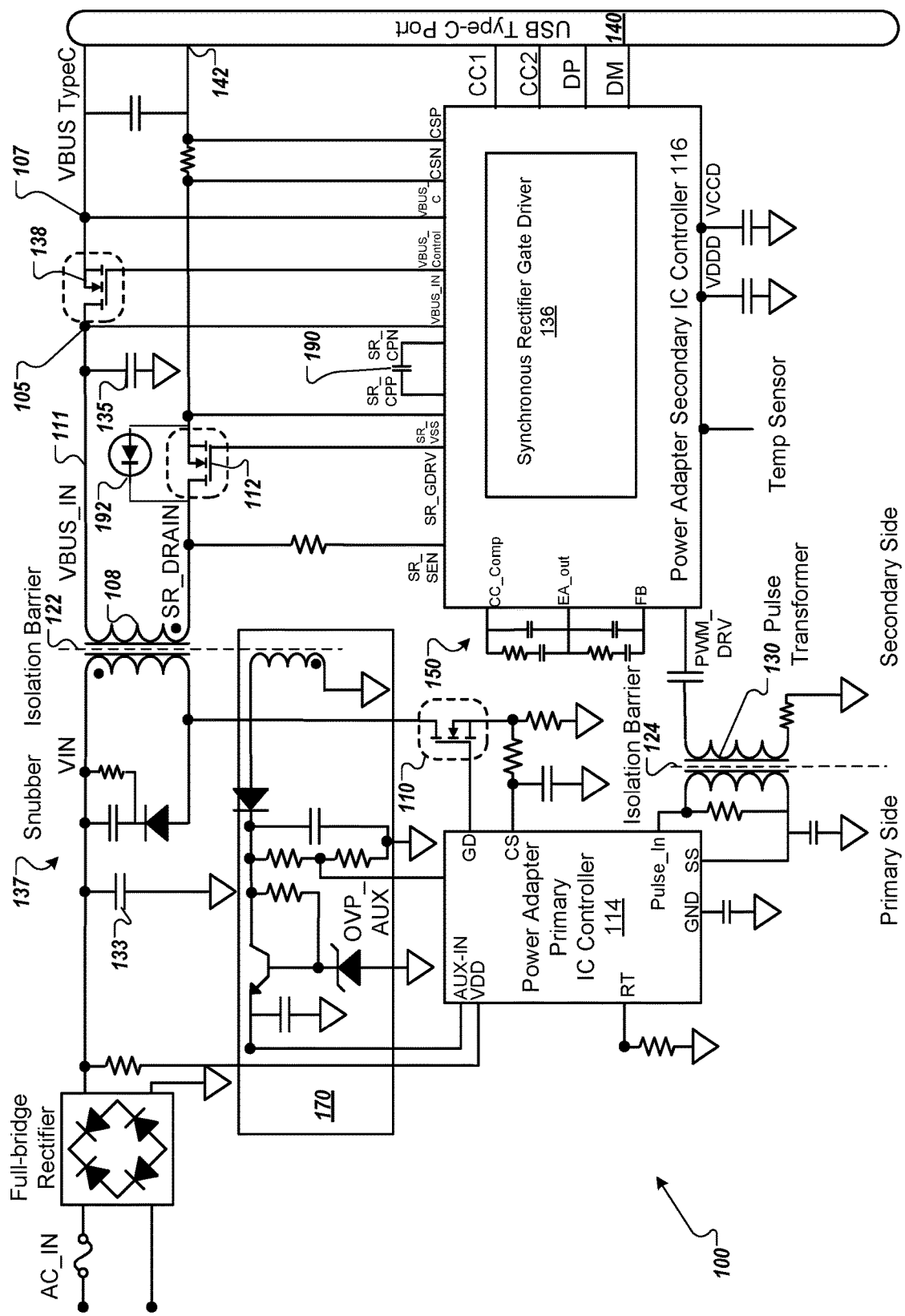
FIG. 1 is a schematic diagram of a USB-PD power adapter with a synchronous rectifier gate driver (SRGD) with an adaptive slew rate control, integrated on a secondary-side controller (also referred to as power adapter secondary IC controller) in one embodiment.

The following description sets forth numerous specific details such as examples of specific systems, components, methods, and so forth, in order to provide a good understanding of various embodiments of the techniques described herein for reducing power consumption using a synchronous switching scheme with adaptive slew rate control to charge and discharge a gate capacitor (e.g., a 0.1 uF gate capacitor) in a secondary-controlled flyback converter, such as used in USB power delivery applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for adiabatically charging and discharging a gate capacitor in a secondary-controlled flyback converter coupled to power lines in electronic devices in USB power delivery (USB-PD). Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. The embodiments described herein can be used for AC-to-DC power adapters, GaN based power adapters operating at 600 kHz frequencies, power adapters with primary or secondary side controllers, power adapters operating in modes of operations, such as quasi-resonant mode (QR), discontinuous conduction mode (DCM), continuous conduction mode (CCM), or the like. The embodiments described herein can be used in power-adapter solutions along with Type-C PD capability A USB-enabled electronic device or a system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0 dated Aug. 11, 2014, Release 1.1 dated Apr. 3, 2015, etc.). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0 released Jul. 5, 2012, Revision 2.0 released Aug. 11, 2014, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

A USB-PD power source may be configured to draw power from an alternating current (AC) power adapter or from another AC source. Thus, as part of an alternating current-to-direct current (AC-DC) conversion, some implementations may use a large bulk capacitor on the power source side of the VBUS line in order to remove the AC component of the power signal. Turn-ON and turn-OFF of power switches (also referred to as power FETs) may allow for further circuit protection based on analysis of current and voltage conditions and the detection of faults.

In one flyback converter, a factor in determining efficiency is a secondary-side FET (e.g., MOSFET switch) which is coupled in parallel to a diode on a secondary side of the flyback converter. An on-resistance (RDSon) of the secondary-side FET along with a rise and fall time of a gate driver on a secondary-side controller which drives the gate of the secondary-side FET determines the efficiency of the flyback converter. In one embodiment, a supply of a gate driver can be as low was 3V, however the gate driver may need at least 5V to achieve a lower on-resistance of the secondary-side FET. This requires the usage of boosted power supply for the drivers. The gate driver generates a boosted voltage at the gate of the secondary-side FET. However, to do so, a charge-pump supply for the gate driver is used. Using a charge pump to generate the boosted voltage supply requires deriving a supply from the battery that is higher than the supply of the gate driver. Charge recycling is not possible with the charge pump, resulting in increased power loss during operation of the flyback converter. Additionally, the flyback converter does not have an adaptive slew control which results in higher peak currents at fast process-voltage-temperature (PVT) corners (e.g., for a gate driver with fast rise and fall times). The flyback converter suffers from increased power consumption, high peak currents creating reliability issues in metal routing lines, and increased supply/ground noise which impacts performance of critical analog blocks.

Described herein are various embodiments of techniques for improving efficiency over a traditional flyback converter and for reducing the power consumption of the gate driver by using a synchronous switching scheme with adaptive slew rate control to adiabatically charge and discharge a gate capacitor and to recycle charge and generate a boosted voltage at a gate of a synchronous rectifier FET (e.g., a secondary-side FET, a secondary-side provider FET, or the like). Instead of using a charge-pump to directly supply the boosted voltage to the gate of the synchronous rectifier FET, the synchronous switching scheme described herein allows for the gate of the synchronous rectifier FET to be charged to a supply voltage level of a secondary-side controller and for the gate capacitor to be charged and discharged with an appropriate timing (e.g., in various phases) in order to add voltage to the supply voltage. This provides a means for a boosted voltage (e.g., twice the supply voltage) to be indirectly generated on the gate of the synchronous rectifier FET. When the synchronous rectifier is to be switched off, excess charge (e.g., to generate the boosted voltage) is recycled back to the gate capacitor in order to recharge the gate capacitor. When the synchronous rectifier FET is to be turned on and requires a boosted voltage supply, charge from the gate capacitor may again be used to boost the voltage supply on the gate of the synchronous rectifier FET. In one embodiment the gate capacitor is a polarized capacitor such as an electrolytic capacitor, a tantalum capacitor, or the like. In another embodiment the gate capacitor can be a non-polarized capacitor, such as a ceramic capacitor, a film capacitor, or the like. In one embodiment, the gate capacitor is a bootstrapped capacitor. The synchronous switching scheme is designed to minimize power consumption, recycle the gate charge, and reduce the peak current (e.g., from 3.381 A to 1.33 A) and noise of the gate driver without impacting the transient performance. The embodiments of the synchronous switching scheme with adaptive slew rate control described herein may address the above-mentioned and other challenges without the additional logic and circuits and complicated protocols described above by adiabatically charging and discharging a gate capacitor to recycle charge and reduce power consumption. In some embodiments, charge may be recycled during discharge phases of the gate capacitor. In some embodiments, the synchronous switching scheme with adaptive slew rate control described herein may be used in a secondary-controlled flyback converter. In some embodiments, the synchronous switching scheme may reduce power consumption of the gate driver by 30%, reduce peak current and supply noise by 2.5 times, and reduce the area by using 5V MOSFETs instead of 10V MOSFETs compared to conventional schemes. The adaptive slew rate control may track the PVT variations of the gate driver and then modulate a drive strength of the gate driver dynamically to meet performance requirements (e.g., at slow corner combination) and to reduce peak current and noise (in fast corner combination).

The embodiments described herein may address the above-mentioned and other challenges by providing, a serial bus-compatible power supply device, such as a serial bus power delivery (SBPD) device with a power control analog subsystem having hardware, firmware, or any combination to communicate information, in synchronous switching scheme with adaptive slew rate control to adiabatically charge and discharge a gate capacitor and generate a boosted voltage at a gate of a secondary-side FET (also referred to as a "synchronous rectifier FET" herein) and to drive a primary-side FET across a galvanic isolation barrier. In one embodiment, the galvanic isolation barrier may be provided by a pulse transformer. In other embodiments, the galvanic isolation may be provided by an opto-coupler, a capacitive isolator, or the like. The SBPD device (also referred to as a "source device" herein) may be a USB compatible power supply device. The embodiments described herein can also be implemented in other types of power adapters, power converters, power delivery circuits, or the like.

FIG. 1 is a schematic diagram of a USB-PD power adapter 100 with a synchronous rectifier gate driver (SRGD) 136 with an adaptive slew rate control, integrated on a secondary-side controller 116 (also referred to as power adapter secondary IC controller) in one embodiment. In one embodiment, the USB-PD power adapter 100 can communicate information across the isolation barrier via a pulse transformer 130. In another embodiment, the USB-PD power adapter 100 can communicate information across an opto-isolator (not shown by FIG. 1). The USB-PD power adapter 100 includes a primary IC controller 114 and a secondary IC controller 116. The secondary IC controller 116 may be disposed in a chip package and includes a USB-PD subsystem configured in accordance with the techniques for gate driver control described herein. The secondary IC controller 116 is configured to negotiate a PD contract with a consumer device (not shown) attached to USB Type-C port 140 and to control through an output pin ("PWM_DRV") the required VBUS voltage that is output from flyback transformer 108. USB Type-C port 140 is typically associated with a Type-C plug, but it should be understood that in various embodiments the USB Type-C port may be associated with a Type-C receptacle instead.

The secondary IC controller 116 includes SRGD 136. The SRGD has a boosted voltage generator circuit, a gate driver circuit, and a phase and slew controller circuit. The boosted voltage generator circuit generates a boosted supply voltage (2*Vddd) on a plate SR_CPP of gate capacitor 190. The boosted voltage is a voltage that is greater than a supply voltage of secondary IC controller 116. The boosted voltage generator block drives the gate capacitor using a bootstrapping principle to generate the boosted voltage on the gate of synchronous rectifier FET 112. The gate driver circuit drives the synchronous rectifier FET of the flyback converter. The phase and slew controller is a control block of the SRGD which generates control signals for different phases of operation and a required slew for the driver. The flyback transformer 108 is coupled to a rectified DC power source and the output can be coupled to synchronous rectifier FET 112 (e.g., SR_FET 412). The VBUS_IN is regulated by an error amplifier which is connected to a compensation network 150. The compensation network 150 can be a resistor-capacitor (RC) circuit specific to the design of USB-PD power adapter 100. Compensation network 150 can be coupled to receive a feedback signal from a first output pin ("FB") of secondary IC controller 116. The compensation network 150 can also be coupled to a second output pin ("EA_out") and a third output pin ("CC_Comp"). The flyback transformer 108 can be coupled to a large bulk capacitor 133, and a snubber circuit 137. The USB-PD power adapter 100 may also include the pulse transformer 130 (or other feedback control mechanisms) for communicating information across an isolation barrier 124.

The SRGD 136 integrated on secondary IC controller 116 is coupled to VBUS line 111 and is configured to control the operation and state of power switches (such as provider FET 138, also referred to as a secondary power switch herein). SRGD 136 provides a synchronous switching scheme with adaptive slew control in order to charge and discharge gate capacitor 190 to recycle charge and generate a boosted voltage on the gate of synchronous rectifier FET 112. In some embodiments, gate capacitor 190 may be charged and discharged adiabatically. VBUS line 111 includes provider FET 138 configured as an on/off switch device controlled by signals from an output pin ("VBUS Control") in the secondary IC controller 116. Provider FET 138 may correspond to a provider FET described herein. In one embodiment, provider FET 138 may be an nFET. In another embodiment, provider FET 138 may be a pFET. On one side of provider switch 138, a power source node 105 on the VBUS line 111 is coupled to second winding of flyback transformer 108, which is coupled to a large bulk capacitor 135 configured to remove the AC component of the power signal. Power source node 105 is coupled to an input pin ("VBUS_IN") of secondary IC controller 116. On the other side of provider FET 138, an output node 107 on VBUS line 111 is coupled to USB Type-C port 140. Output node 107 is coupled to another input pin ("VBUS_C") of the secondary IC controller 116. The GND terminal 142 of USB Type-C port 140 is coupled to a synchronous rectifier FET 112.

In operation, the direction of power flow on VBUS line 111 is from flyback transformer 108 to a consumer device, such as a laptop computer (not shown), that is attached to USB Type-C port 140. When a PD contract with the consumer device is negotiated, the secondary IC controller 116 turns on provider FET 138 to provide power to the consumer device at the negotiated voltage and/or current level(s). A high-to-low voltage transition on VBUS line 111 may be needed when the PD contract is dynamically re-negotiated to lower the VBUS voltage and/or current, e.g., when the consumer device has finished charging its battery and now needs power only to operate.

A control signal may be sent to limit the gate-source voltage of provider FET 138 and to turn off power switch 138, thereby disconnecting the USB Type-C port 140 from flyback transformer 108. The provider FET 138 is turned off by driving the output of VBUS Control to zero. By limiting the gate source voltage of the power switch 138, the FET is protected from getting damaged. This disconnection may be caused by an over-voltage condition, an over-current condition, or other conditions that may require disconnection of the USB Type-C port 140 from the flyback transformer 108 for protection of circuits coupled to the USB Type C port 140.

In a further embodiment, an auxiliary circuit 170 can be coupled to the primary IC controller 114. An auxiliary output pin ("AUX_IN") and an overvoltage protection auxiliary pin ("OVP_AUX") are coupled to the auxiliary circuit 170. The auxiliary circuit 170 can operate to protect for overvoltage of the VBUS_IN 111 and also provide power (AUX_IN) to the Primary IC 114 once start-up is complete.

As noted above, USB-PD power adapter 100 permits a synchronous switching scheme with adaptive slew rate control to charge and discharge (e.g., change a charge on) gate capacitor 190 and generate a boosted voltage at a gate of a secondary-side FET (also referred to as a "synchronous rectifier FET" herein) via SRGD 136. A PWM driver circuit of secondary IC controller 116 can output a signal on an output pin ("PWM_DRV") to communicate information across isolation barrier 124 via pulse transformer 130. As noted herein, PWM driver circuit can be other driver circuits that create pulses on the output pin to communicate information across isolation barrier 124. The primary IC controller 114 can include a detection circuit that receives a signal on an input pin ("Pulse_In") and detects when secondary IC controller 116 is communicating information. In another embodiment, primary IC controller 114 can communicate information across isolation barrier 122 via flyback transformer 108. The primary IC controller 114 can include a circuit to vary pulses received from secondary IC controller 116 via pulse transformer 130. By varying the pulses, primary IC controller 114 can send information across flyback transformer 108 via primary power switch 110. The secondary IC controller 116 can include a circuit that measures the drain (SR_DRAIN) of secondary power switch 112 (e.g., the synchronous rectifier FET).

In another embodiment, an AC-DC power adapter device includes a flyback converter (with a flyback transformer) or an isolated power converter that is coupled between AC terminals and DC terminals. The flyback transformer converts AC power on the AC terminals to DC power on the DC terminals with galvanic isolation between the AC terminals and the DC terminals. The AC-DC power adapter device also includes a primary-side controller coupled to the flyback transformer and a secondary-side controller coupled to the flyback transformer. A primary-side power switch (also referred to as primary-side switching FET or primary FET) is coupled to a primary winding of the flyback transformer and the primary-side controller. A secondary-side FET (also referred to as a synchronous rectifier FET) is coupled to a secondary winding of the flyback transformer and the secondary-side controller. The primary-side controller is configured to receive a first signal from the secondary-side controller across a galvanic isolation barrier and apply a second signal to the primary-side power switch in response to the first signal to turn-on and turn-off the primary-side power switch. The SRGD of the secondary-side controller is also configured to generate a synchronous switching scheme with adaptive slew rate control to charge and discharge a gate capacitor and generate a boosted voltage at a gate of the synchronous rectifier FET, as described herein.

In a further embodiment, the primary-side controller includes a pulse receiver and a gate driver. The pulse receiver receives the first signal from the secondary-side controller across the galvanic isolation barrier. The first signal includes a first turn-on pulse to turn on the primary-side power switch and a first turn-off pulse to turn off the primary-side power switch. In response, the driver, which is coupled to the pulse receiver and the primary-side power switch, applies the first turn-on pulse and the first turn-off pulse to the primary-side power switch.

In a further embodiment, the AC-DC power adapter device includes a pulse transformer coupled between the primary-side controller and the secondary-side controller. The primary-side controller is configured to receive the first signal from the secondary-side controller as one or more pulses via the pulse transformer. The primary-side controller can detect when the secondary-side controller is communicating information via the pulse transformer as described herein.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, the SBPD device is a USB-PD device that is compatible with the USB-PD standard or more generally with the USB standard. For example, the SBPD device may be used to provide an output voltage (e.g., Vbus_c, power supply voltage) based on an input voltage (e.g., Vbus_in, power supply voltage). The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier.

In embodiments, the SBPD device is connected to power source, such as a wall socket power source that provides AC power. In other embodiments, the power source may be a different power source, such as a battery, and may provide DC power to the SBPD device. The power converter may convert the power received from the power source (e.g., convert power received to Vbus_in, which may range from 3.3V to 21.5V). For example, the power converter may be an AC-DC converter and convert AC power from the power source to DC power. In some embodiments, the power converter is a flyback converter, such as a secondary-controlled flyback converter, that provides galvanic isolation between the input (e.g., primary side) and the output (e.g., secondary side). In another embodiment, the device may be a consumer device receiving power from the SBPD device, wherein the consumer device may employ a synchronous switching scheme with adaptive slew rate control to charge and discharge its gate capacitor and generate a boosted voltage at a gate of its synchronous rectifier FET with an SRGD integrated onto the secondary-side controller of the consumer device.

In some embodiments, the SBPD device provides Vbus_c to a sink device (e.g., via communication channel (CC) specifying a particular output voltage, and possibly an output current). The SBPD device may also provide access to a ground potential (e.g., ground) to the sink device. In some embodiments, the providing of the Vbus_c is compatible with the USB-PD standard. The power control analog subsystem may receive Vbus_in from the power converter. The power control analog subsystem may output Vbus_in. In some embodiments, the power control analog subsystem is a USB Type-C controller compatible with the USB Type-C standard. The power control analog subsystem may provide system interrupts responsive to the Vbus_in and the Vbus_c.

In some embodiments, any of the components of SBPD device may be part of an IC or alternatively any of the components of SBPD device may be implemented in its own IC. For example, the power converter and the power control analog subsystem may each be discrete ICs with separate packaging and pin configurations.

In some embodiments, the SBPD device may provide a complete USB Type-C and USB-PD port control solution for notebooks, dongles, monitors, docking stations, power adapters, vehicle chargers, power banks, mobile adaptors, and the like.

Figure 2:
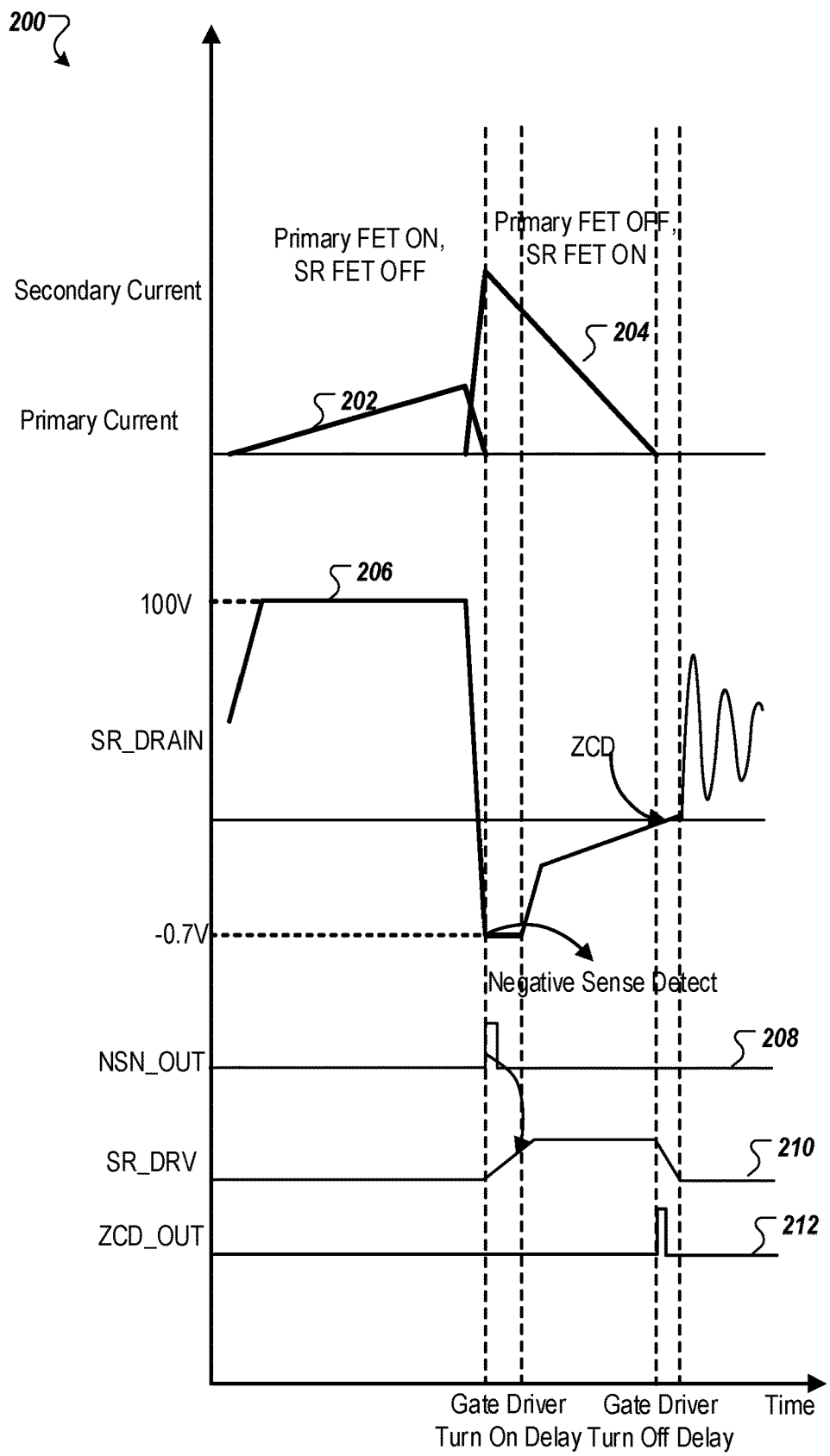
FIG. 2 is a timing diagram of a synchronous switching scheme, showing switching current and voltage waveforms on a secondary-side of a flyback converter according to one embodiment.

One element that determines efficiency in the USB-PD power adapter 100 is a synchronous rectifier FET 112 (also referred to a secondary-side FET) which is coupled in parallel to synchronous rectifier diode 192. An on-resistance (RDSon) of synchronous rectifier FET 112 may determine a voltage drop across synchronous rectifier FET 112. In addition, the turn-on and turn-off time of synchronous rectifier FET may determine the power loss across synchronous rectifier diode 192, since during the turn-on process, synchronous rectifier diode 192 conducts current until synchronous rectifier FET 112 is turned on. Also, a faster turn-off may be required as it creates a short between Vbus to ground once the inductor current crosses zero. A lower on-resistance of synchronous rectifier FET 112 can be achieved by boosting the voltage (e.g., to ~10V) at the gate of the synchronous rectifier FET 112. Faster turn-on and turn-off times (e.g., ~100 ns) can be determined by the drive strength of the SRGD. However, in order to meet faster turn-on and turn-off times at the slowest process-voltage-temperature (PVT) corner, there may be an adverse effect of high peak currents and increased supply and ground noise in fast PVT corners. FIG. 2 describes in greater detail the synchronous switching scheme with adaptive slew rate control designed to minimize power consumption, recycle a gate charge between the gate capacitor and the gate of the synchronous rectifier FET, and reduce the peak current and noise of the SRGD.

FIG. 2 is a timing diagram of a synchronous switching scheme, showing switching current and voltage waveforms on a secondary-side of a flyback converter according to one embodiment. Referring back to FIG. 1, initially, when primary-side FET 110 is to turn on and synchronous rectifier FET 112 is to turn off, a primary current, shown by graph 202, increases. Voltage plot 206 shows that a voltage on a drain node of the synchronous rectifier FET 112 (SR_DRAIN) increases to 100V. When primary-side FET 110 should be turned off and the synchronous rectifier FET turned on, the primary-current decreases, as shown by graph 202, and a secondary-current increases, as shown by graph 204. The voltage on the drain node of synchronous rectifier FET 112 decreases to –0.7V, which triggers a negative sense detect shown by voltage plot 208. The negative sense detect triggers a delay to turn on SRGD 136, as shown by voltage plot 210. When primary-side FET 110 is off and synchronous rectifier FET 112 is on, the current in graph 204 decreases. The voltage on the drain of synchronous rectifier FET 112 increases. When the voltage crosses zero, a zero-crossing detection is triggered, shown by graph 212. The voltage on the gate of the synchronous rectifier FET decreases, and takes an amount of time to reach 0V. The amount of time is a delay to turn off the synchronous rectifier FET.

Figure 3:
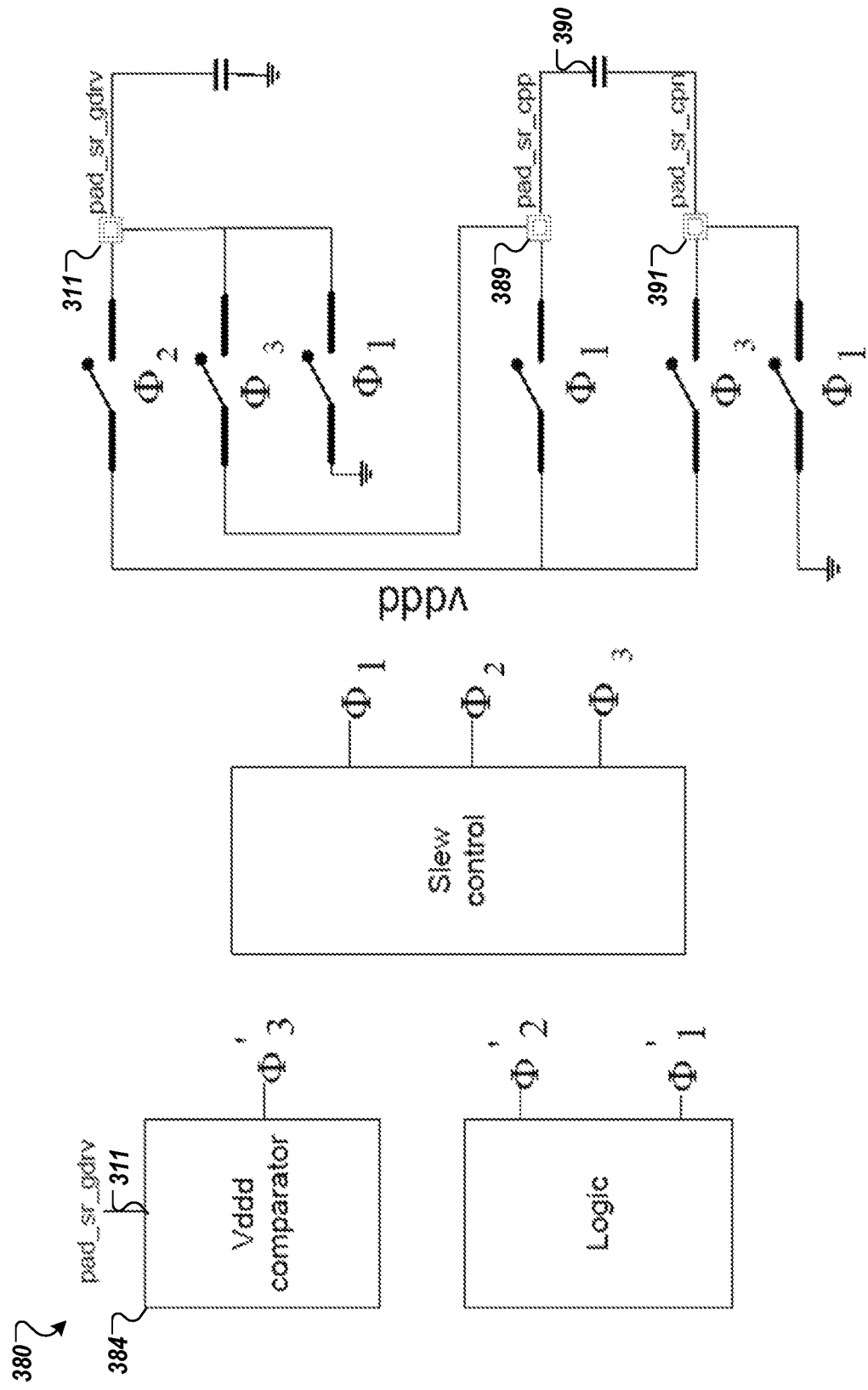
FIG. 3 is a schematic diagram of a phase and slew controller circuit of an SRGD integrated on a secondary-side controller in a secondary-controlled flyback converter according to one embodiment.

FIG. 3 is a schematic diagram of a phase and slew controller circuit 380 of an SRGD integrated on a secondary-side controller in a secondary-controlled flyback converter according to one embodiment. Although not all components of the secondary-controlled flyback converter are shown, the secondary-controlled flyback converter is similar to the secondary-controlled flyback converter of the USB-PD power adapter of FIG. 1, as noted by similar reference numbers. The phase and slew controller may compare a first signal with a voltage on terminal 311 coupled to a gate of a synchronous rectifier FET and generate control signals to adiabatically charge and discharge gate capacitor 390 and generate a boosted voltage of 2*Vddd (e.g., twice the supply voltage) by recycling charge from terminal 311 coupled to the gate of the synchronous rectifier FET to gate capacitor 390 in phases.

A first phase $\Phi_1$, may be a default phase of an SRGD. In the first phase, a terminal 389 coupled to the first plate of gate capacitor 390 is pulled up to the supply voltage level (Vddd) while terminal 311 coupled to the gate of the synchronous rectifier FET and terminal 391 coupled to the second plate of the gate capacitor 390 are pulled down to ground (0V). During the first phase, phase and slew controller circuit 380 may measure a signal with a first voltage at the gate of the synchronous rectifier FET and compare the first voltage against a second voltage (e.g., a supply voltage, or Vddd). During the first phase, the first voltage is less than the second voltage. In the second phase, terminal 311 coupled to the gate of the synchronous rectifier FET begins to charge up to the supply voltage level Vddd. During the second phase, phase and slew controller circuit 380 measures a second signal at the gate of the synchronous rectifier FET. When the voltage of the second signal is equal to the second voltage (e.g., Vddd), a third phase is triggered. In one embodiment, comparator 384 detects when the voltage at terminal 311 coupled to the gate of the synchronous rectifier FET reaches the supply voltage level Vddd, and triggers the third phase. In the third phase $\Phi_3$, terminal 391 coupled to the second plate of the gate capacitor is pulled up to the supply voltage level Vddd and terminal 311 coupled to the gate of the synchronous rectifier FET may be pulled up to the boosted voltage level 2*Vddd through terminal 389 coupled to the first plate of the gate capacitor. During the third phase, phase and slew controller circuit 380 measures a third signal. By the end of the third phase, a voltage of the third signal reaches a third voltage level (e.g., 2*Vddd) greater than the second voltage level. During a fourth phase, charge recycling occurs and charge moves from terminal 311 coupled to the gate of the synchronous rectifier FET to terminal 389 coupled to first plate of gate capacitor 390. The cycle of phases may then be repeated. It should be noted that the names of the phases are used to simplify descriptions.

Figure 4:
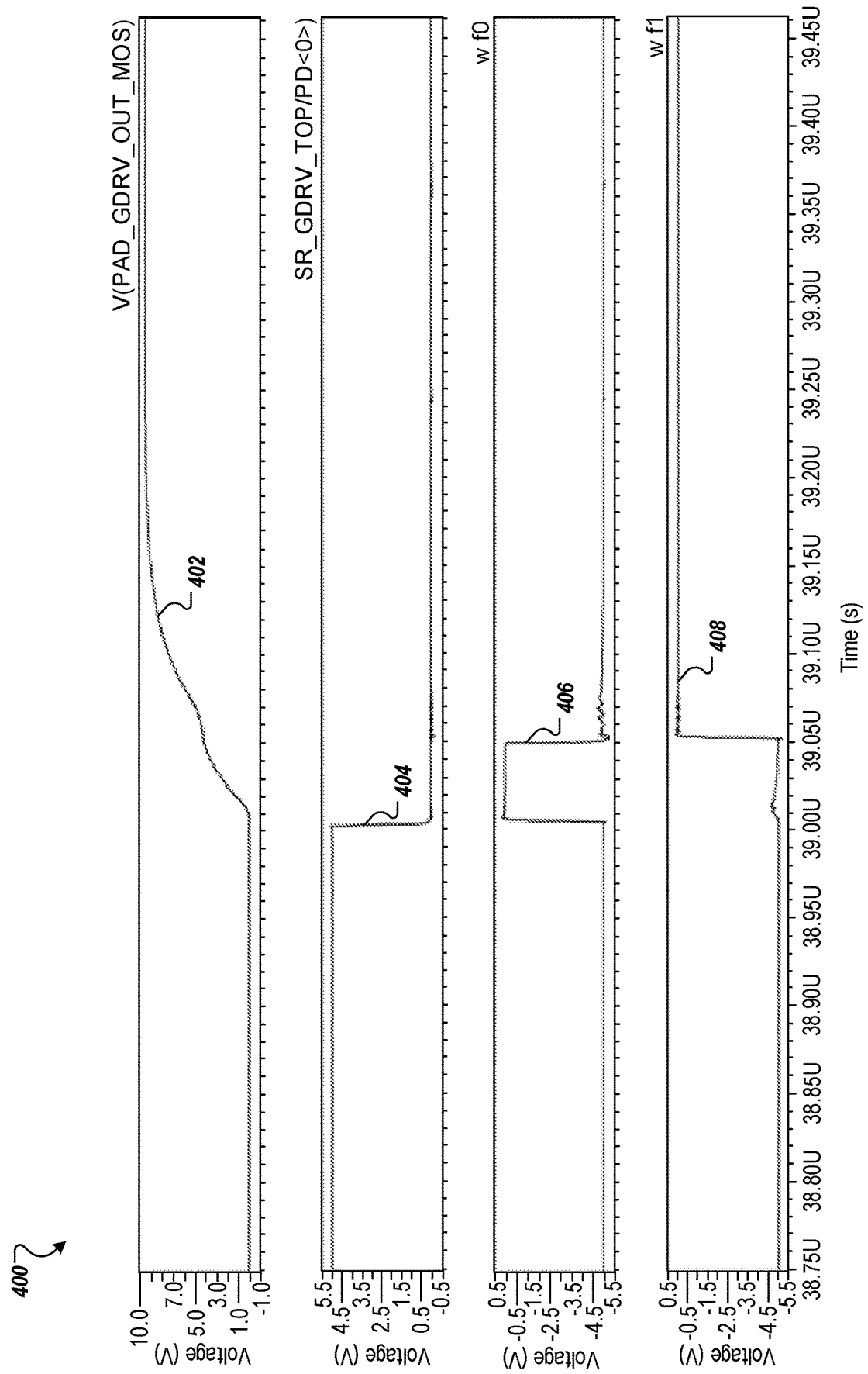
FIG. 4 is a timing and voltage plot corresponding to control signals generated by a phase and slew controller to enable phases of operation of an SRGD integrated on a secondary-side controller in a secondary-controlled flyback converter according to one embodiment.

FIG. 4 is a timing and voltage plot 400 corresponding to control signals generated by a phase and slew controller to enable phases of operation of an SRGD integrated on a secondary-side controller in a secondary-controlled flyback converter according to one embodiment. The phases of operation of the SRGD are described in FIG. 3 and later in more detail in FIG. 7. In one embodiment, phase and slew controller may be phase and slew controller 380 of FIG. 3. Referring back to FIG. 1, graph 402 shows a voltage level on the gate of synchronous rectifier FET 112 at an output (SR_GDRV) of SRGD 136. Graph 404 shows a first control signal generated by the phase and slew controller to enable a first phase of operation of the SRGD, where the gate of synchronous rectifier FET 112 may be at 0V, a first plate of gate capacitor 190 may be at a first voltage level (Vddd, e.g., 5V, 3.3V, 3.5V, or the like), and a second plate of gate capacitor 190 may be at 0V. Graph 406 shows a second control signal generated by the phase and slew controller to enable a second phase, during which the gate of the synchronous rectifier FET begins to charge from 0V to a first voltage level (e.g., Vddd). Graph 408 shows a third control signal generated by the phase and slew controller to enable a third phase of operation of the SRGD. The phase and slew controller may be triggered to generate the third control signal to enable a third phase when the voltage at the gate of synchronous rectifier FET 112 reaches the first voltage level (Vddd). During the third phase, the gate of synchronous rectifier FET 112 is charged from the first voltage level (Vddd) to a second voltage level (2*Vddd, e.g., 10V, 6.6V, 7V, or the like), the first plate of the gate capacitor is charged from the first voltage level (Vddd) to the second voltage level (2*Vddd), and the second plate of the gate capacitor is charged from 0V to the first voltage level (Vddd). Charge recycling (e.g., from the gate of synchronous rectifier FET 112 to the first plate of the gate capacitor) may be done during a transition between the third phase and the first phase. It should be noted that although 5V and 10V for Vddd and 2*Vddd are used with respect to the depicted embodiments, alternatively, Vddd and 2*Vddd can be other values. Similarly, multipliers other than 2 or approximately 2 can be achieved in other implementations.

Figure 5:
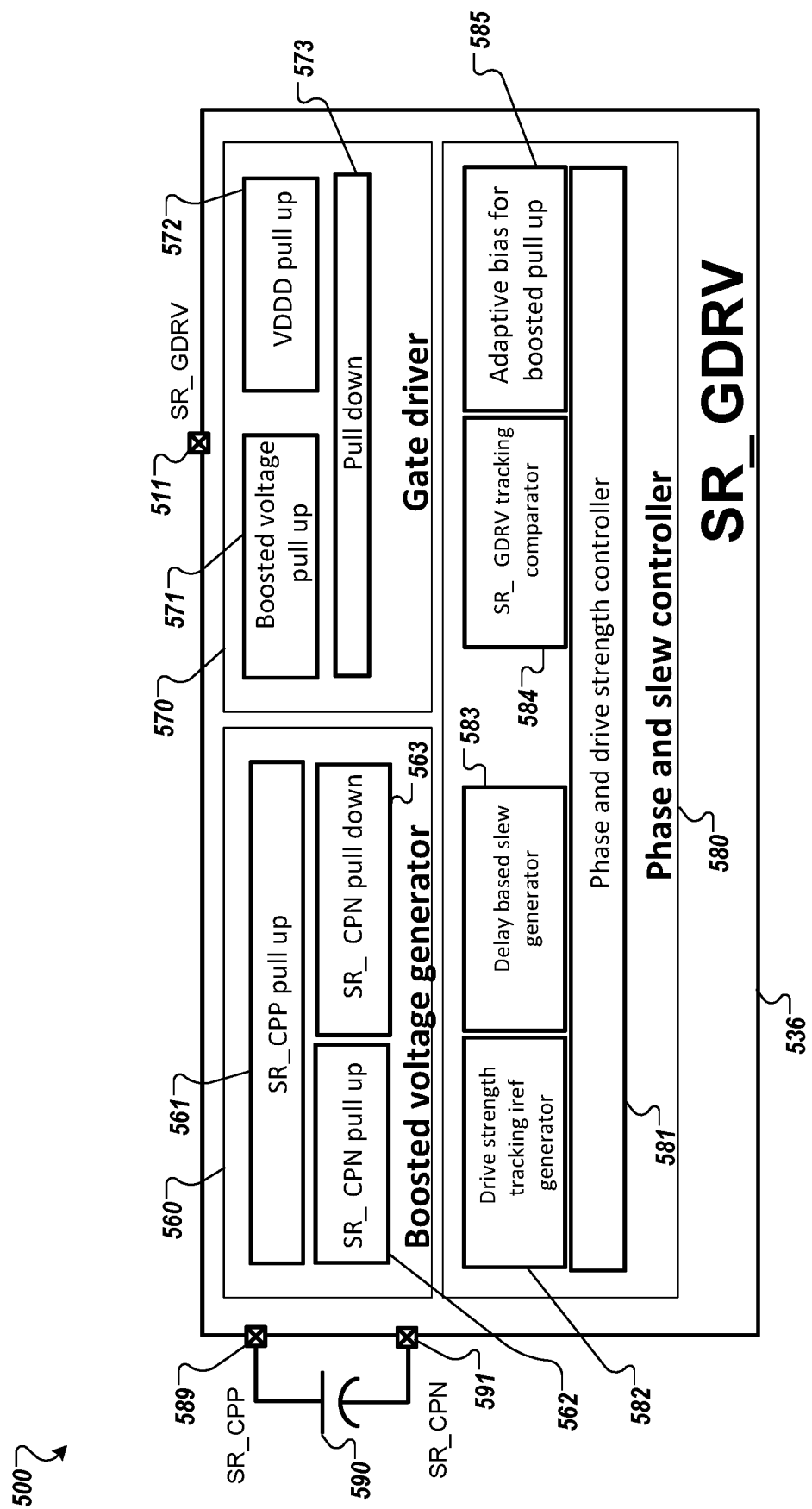
FIG. 5 is a block diagram of an SRGD integrated on a secondary-side controller in a secondary-controlled flyback converter according to one embodiment.

FIG. 5 is a block diagram of an SRGD 536 integrated on a secondary-side controller in a secondary-controlled flyback converter according to one embodiment. Although not all components of the secondary-controlled flyback converter are shown, the secondary-controlled flyback converter is similar to the secondary-controlled flyback converter of the USB-PD power adapter of FIG. 1, as noted by similar reference numbers. The depicted embodiment illustrates a new architecture for a secondary-side gate driver (e.g., SRGD 536) that consumes little power and is reliable. SRGD 536 can generate an output voltage that is double the supply voltage of the IC (Vddd). SRGD 536 includes boosted voltage generator circuit 560, gate driver circuit 570, and phase and slew controller circuit 580. The SRGD 536 is coupled to gate capacitor 590 via terminals 589 and 591 and a gate of a synchronous rectifier FET (not shown in FIG. 5) via terminal 511. The combination of boosted voltage generator circuit 560, gate driver circuit 570, and phase and slew controller circuit 580 is configured to generate the boosted voltage on terminal 511 of the synchronous rectifier FET.

Boosted voltage generator circuit 560 is responsible for generating the boosted voltage supply (2*Vddd) on a first terminal 589 (SR_CPP) of gate capacitor 590. The boosted voltage generator circuit drives gate capacitor 590 and uses a bootstrapping principle to generate the boosted voltage supply on the first terminal 589 (SR_CPP) of gate capacitor 590. In one embodiment, gate capacitor 590 may have a capacitance of 100 nF. The boosted voltage generator circuit 560 includes a first pull-up path 561, a second pull-up path 562, and a pull-down path 563.

The gate driver circuit 570 is configured to drive the synchronous rectifier FET (not shown in FIG. 5). The gate driver circuit 570 includes a first pull-up path 571, a second pull-up path 572, and a pull-down path 573.

The phase and slew controller circuit 580 is configured to generate control signals for different phases of operation of SRGD 536 and is further configured to generate a required slew for SRGD 536. The phase and slew controller circuit generates control signals for different phase of operation by tracking the voltage level on terminal 511 of the synchronous rectifier FET. In one embodiment, in order to track the voltage level on terminal 511 of the synchronous rectifier FET, the phase and slew controller circuit measures a voltage on the gate of the synchronous rectifier FET and compares it to the supply voltage (Vddd) of the IC. The comparing may be done by a comparator, such as tracking comparator 584. The phase and slew controller circuit 580 includes phase and drive strength controller 581, current generator 582, a slew generator 583, the tracking comparator 584, and a bias generator 585.

Figure 6:
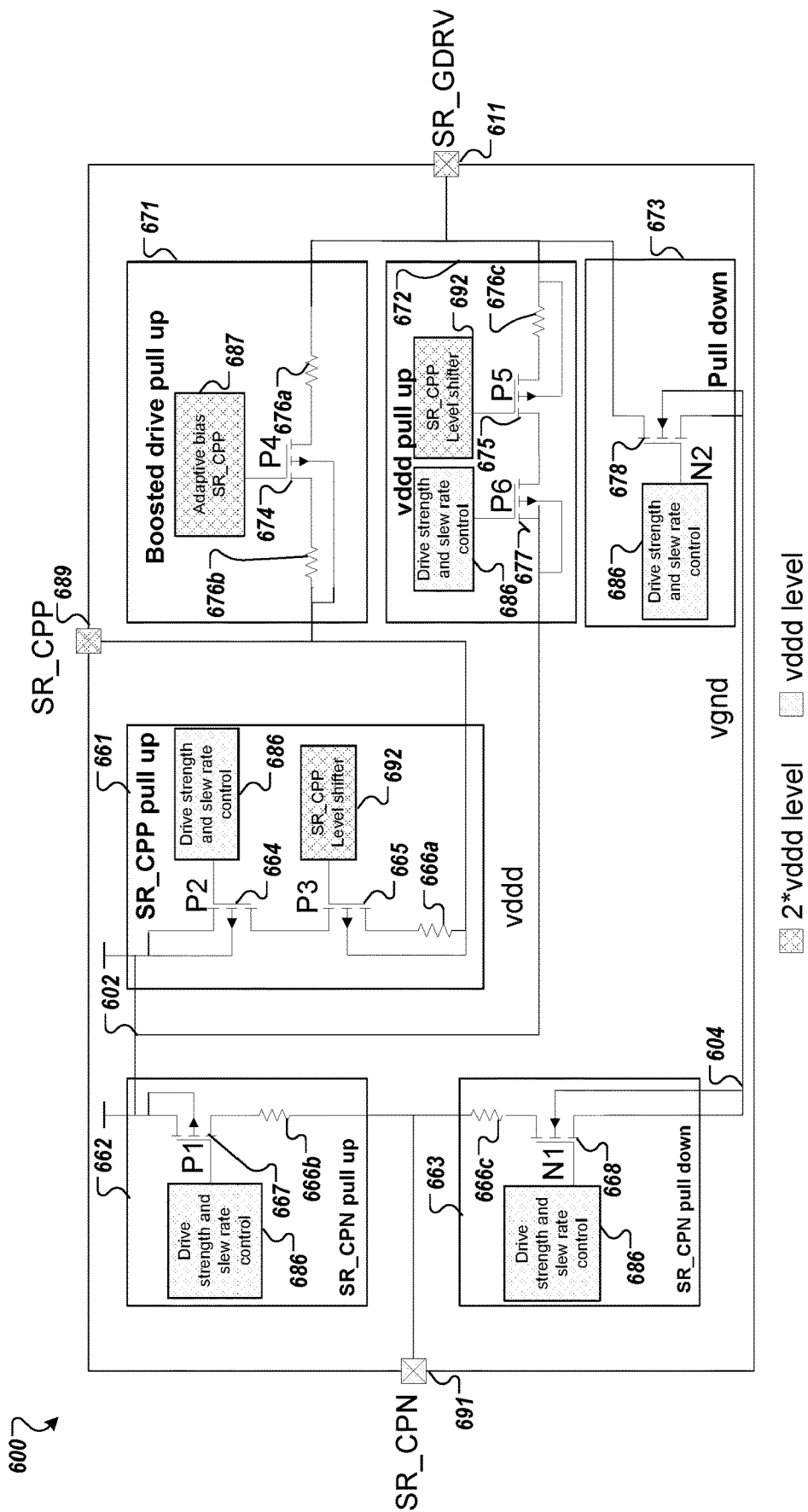
FIG. 6 is a block diagram of an implementation of a boosted voltage generator circuit and a gate driver circuit coupled to a phase and slew rate controller circuit of an SRGD integrated on a secondary-side controller in a secondary-controlled flyback converter according to one embodiment.

FIG. 6 is a block diagram of an implementation of a boosted voltage generator circuit and a gate driver circuit coupled to a phase and slew rate controller circuit of an SRGD integrated on a secondary-side controller in a secondary-controlled flyback converter according to one embodiment. Although not all components of the secondary-controlled flyback converter are shown, the secondary-controlled flyback converter is similar to the secondary-controlled flyback converter of the USB-PD power adapter of FIG. 1, as noted by similar reference numbers.

The voltage generator circuit (e.g., to generate a boosted voltage) includes a pull-up path 661, pull-up path 662, and pull-down path 663. Pull-up path 661 is coupled to terminal 689 of a gate capacitor (e.g., gate capacitor 190 of FIG. 1, not shown in FIG. 6). Pull-up path 661 is further coupled to node 602 at a voltage level Vddd. Node 602 is coupled between pull-up path 662 and pull-up path 661. Pull-up path 662 is coupled between the node 602 and to terminal 691 of the gate capacitor (e.g., gate capacitor 190 of FIG. 1, not shown in FIG. 6). Pull-down path 663 is coupled between the terminal 691 of the gate capacitor and node 604. Node 604 is at a voltage level Vgnd, which is lower than Vddd.

The gate driver circuit includes pull-up path 671, pull-up path 672, and pull-down path 673. Pull-up path 671 is coupled between the terminal 689 of the gate capacitor and a terminal 611 coupled to a gate of a synchronous rectifier FET (e.g., synchronous rectifier FET 112 of FIG. 1, not shown in FIG. 6). Pull-up path 672 is coupled to pull-up path 671 and is further coupled between the node 602 and the terminal 611 of the synchronous rectifier FET. Pull-down path 673 is coupled to pull-up path 672 and to the node 604.

A pull-up path, such as pull-up paths 661, 662, 671, and 672, may be circuitry to provide a low resistance path to the node 602 (at the Vddd voltage level) when enabled, and a high resistance path to the node 602 when disabled. Pull-up paths, such as pull-up paths 661, 662, 671, and 672 may be pull-up elements, current sources, resistive elements, or the like. Pull-up paths 661, 662, 671, and 672 may be enabled or disabled using switches, FETs, MOSFETs, or the like. A pull-down path, such as the pull-down paths 663 and 673, may be circuitry to provide a low resistance path to the node 604 (at the Vgnd voltage level) when enabled, and a high resistance path to the node 604 when disabled. Pull-down paths, such as pull-down paths 663 and 673 may be pull-down elements, current sinks, resistive elements, or the like. Pull-down paths 663 and 673 may be enabled or disabled using switches, FETs, MOSFETs, or the like. Control signals to enable or disable pull-up paths and pull-down paths of the SRGD may be provided from the phase and slew controller.

Pull-up path 661 (SR_CPP pull up) includes switch 664 (P2) coupled to drive strength and slew rate controller 686. In one embodiment, the switch 664 may be a p-channel FET (pFET). Referring back to FIG. 5, the drive strength and slew rate controller may include phase and drive strength controller 581, current generator 582 (e.g., drive strength tracking iref generator), and slew generator 583 (e.g., delay-based slew generator). The drive strength and slew rate controller 686 may provide control signals to enable or disable (e.g., switch on or switch off; or turn on or turn off) the switch 664. Switch 664 is coupled to switch 665 (P3). Switch 665 is coupled to level shifter 692. In one embodiment level shifter 692 is a SR_CPP level shifter. In some embodiments, level shifter 692 may be a logic-level shifter or a voltage level translator. In some embodiments, level shifter 692 may be a unidirectional level shifter or a bi-directional level shifter. Switch 665 is coupled to resistor 666a, and the resistor 666a is coupled to terminal 689 (SR_CPP) of the gate capacitor. Switch 664 is coupled to node 602 at the voltage level Vddd.

Pull-up path 662 (SR_CPN pull up) includes switch 667 (P1) coupled to the node 602. Switch 667 is further coupled to the drive strength and slew rate controller 686, which may provide the control signals to enable or disable the switch 667. Resistor 666b is coupled between switch 667 and the terminal 691 (SR_CPN) of the gate capacitor.

Pull-down path 663 (SR_CPN pull down) includes resistor 666c coupled between terminal 691 of the gate capacitor and switch 668 (N1). Switch 668 is coupled to drive strength and slew rate controller 686, which may provide the control signals to enable or disable switch 668. Switch 668 is further coupled to node 604 at the Vgnd voltage level. In some embodiments, switch 668 may be an n-channel FET (nFET).

Pull-up path 671 (boosted drive pull up) includes resistor 676a coupled between the terminal 611 (SR_GDRV) of the synchronous rectifier FET and switch 674 (P4). Switch 674 is coupled to adaptive bias controller 687 (adaptive bias SR_CPP). Referring back to FIG. 5, the adaptive bias controller 687 may include phase and drive strength controller 581, comparator 584 (e.g., SR_DGRV tracking comparator) and adaptive bias generator 585 (e.g., adaptive bias for boosted pull up). Adaptive bias controller 687 is to send control signals to enable or disable (e.g., turn on or turn off) switch 674 (e.g., by generating a voltage at the gate of switch 674 in order to minimize the peak current and to meet rise and fall time requirements of the gate driver (SRGD)) and generate a voltage (e.g., a boosted voltage or a driver voltage) at terminal 611 of the synchronous rectifier FET. Resistor 676b is coupled between terminal 689 of the gate capacitor and switch 674.

Pull-up path 672 (vddd pull up) includes resistor 676c coupled between terminal 611 of the synchronous rectifier FET and switch 675 (P5). Switch 675 is coupled to the level shifter 692. Switch 675 is coupled to switch 677 (P6). Switch 677 is coupled to drive strength and slew rate controller 686, which may provide the control signals to enable or disable switch 677. Switch 677 is further coupled to node 602 at the voltage level Vddd.

Pull-down path 673 (pull down) includes switch 678 (N2) coupled to terminal 611 of the synchronous rectifier FET and drive strength and slew rate controller 686. The drive strength and slew rate controller may provide the control signals to enable or disable switch 678. Switch 678 is further coupled to node 604 at the Vgnd voltage level.

Switches 664, 665, 667, 668, 674, 675, 677, and 678 may be n-channel FETs (nFETs), p-channel FETs (pFETs), bipolar transistors, or the like, or any combination of different types of switches. Drive strength and slew rate controller 686 may be at the Vddd voltage level. Level shifter 692 and the adaptive bias controller 687 may be at 2*Vddd voltage level (e.g., at a voltage level which is twice the Vddd voltage level). The adaptive bias controller is to send control signals to enable or disable (e.g., turn on or turn off) the switches (e.g., by generating a voltage at the gate of the switch in order to minimize the peak current and to meet rise and fall time requirements of the gate driver (SRGD)). Resistors 666a, 666b, 676a, 676b, and 676c may be pull-up elements, resistive elements, or the like. Resistor 666c may be a pull-down element, resistive element, or the like.

Referring back to FIG. 5, phase and slew controller circuit 580 is to generate control signals to enable or disable pull-up paths 661, 662, 671, and 672 and to enable or disable pull-down paths 663 and 673. By enabling or disabling pull-up paths 661, 662, 671, and 672 and pull-down paths 663 and 673, phase and slew controller circuit 580 can controller the SRGD to operate in one of a first phase, a second phase, a third phase, or a fourth phase in order to implement a synchronous switching scheme with adaptive slew rate control to adiabatically charge and discharge gate capacitor 590 and to generate a boosted voltage (e.g., 2*Vddd) at terminal 511 of the synchronous rectifier FET, as described in more detail in reference to FIG. 7. The slew rate may be controlled by enabling (e.g., turning on) more devices with time, and an adaptive delay is controlled by an adaptive slew control circuit, as described in more detail in reference to FIGS. 12A-B. It should be noted that in other implementations, the polarity of the FETs can be changed into other configurations to adiabatically charge and discharge the gate capacitor for generating the boosted voltage on the synchronous rectifier FET.

Figure 7:
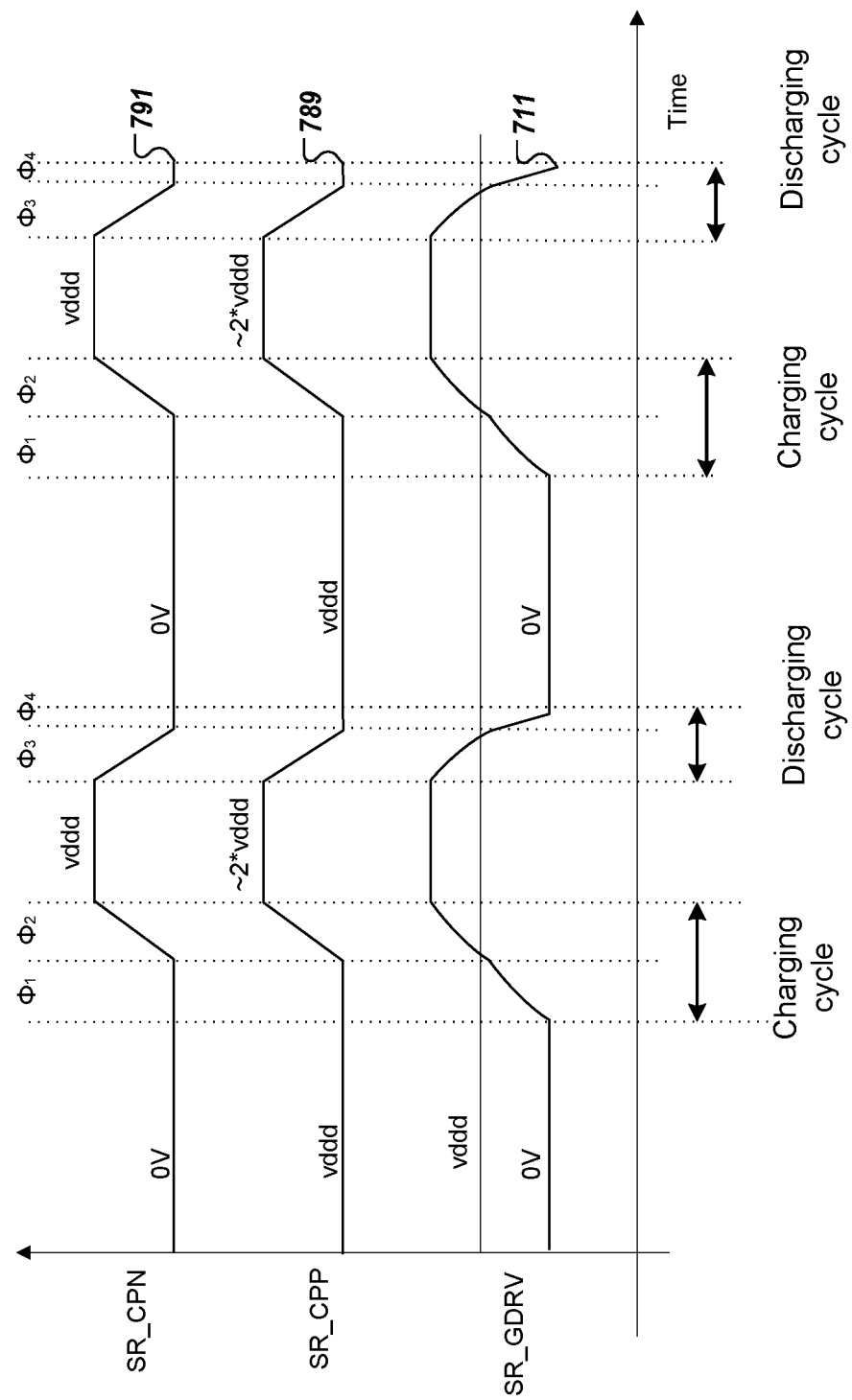
FIG. 7 is a timing diagram illustrating voltages on a gate capacitor and a gate of a synchronous rectifier FET during operation of an SRGD integrated on a secondary-side controller of a USB-PD power adapter according to one embodiment.

FIG. 7 is a timing diagram illustrating voltages on a gate capacitor and a gate of a synchronous rectifier FET during operation of an SRGD integrated on a secondary-side controller of a USB-PD power adapter according to one embodiment. The illustrated timing diagrams 791, 789, and 711 of the voltages on the negative plate of the gate capacitor, the positive plate of the gate capacitor, and the gate of the synchronous rectifier FET, respectively, are shown. In some embodiments, the synchronous switching scheme with adaptive slew rate control to adiabatically charge and discharge a gate capacitor (e.g., gate capacitor 190 of FIG. 1 or gate capacitor 590 of FIG. 5) and generate a boosted voltage (e.g., 2*Vddd or approximately 2*Vddd), greater than a supply voltage (Vddd) of the secondary-side controller, at a gate of a synchronous rectifier FET (e.g., synchronous rectifier FET 112 of FIG. 1) may reduce power consumption of the secondary-side controller by 30%. Instead of charging the gate capacitor to the boosted voltage directly using a charge pump, the gate capacitor can be charged adiabatically (e.g., with very little or no dissipated energy). The gate capacitor may be charged and discharged in phases where the phase change depends on a relative voltage difference between a supply voltage (Vddd) and a voltage on the gate of the synchronous rectifier FET. The SRGD described in the present disclosure, (e.g., SRGD 136 of FIG. 1 or SRGD 536 of FIG. 5) may have information about voltages on a positive plate (e.g., a first plate, plate 189 of FIG. 1, plate (or terminal) 589 of FIG. 5, or plate (or terminal) 689 of FIG. 6) of the gate capacitor, a negative plate (e.g., a second plate, plate 191 of FIG. 1, plate (or terminal) 591 of FIG. 5, or plate (or terminal) 691 of FIG. 6), and the gate (e.g., gate (or terminal) 511 of FIG. 5, or gate (or terminal) 611 of FIG. 6) of the synchronous rectifier FET.

In the depicted embodiment, the positive plate of the gate capacitor may have a boosted switching supply voltage whose value can range between a chip internal supply voltage, Vddd, and 2*Vddd. The positive plate of the gate capacitor may act as a supply for the boosted voltage pull-up (e.g., first pull-up path 571 of FIG. 5 or pull-up path 671 of FIG. 6). A voltage on the negative plate of the gate capacitor can range between 0V and Vddd in order to generate the boosted voltage supply (2*Vddd) on the positive plate of the gate capacitor. Terminals 511 of FIG. 5 or 611 of FIG. 6 may be coupled to an output of the SRGD to drive the gate voltage of the synchronous rectifier FET. The SRGD is to control the voltages on the positive plate of the gate capacitor, the negative plate of the gate capacitor, and the gate of the synchronous rectifier FET in a series of phases.

The remainder of the description of FIG. 7 will be done in reference to FIGS. 5-6. Initially, the gate of the synchronous rectifier FET is at 0V, the negative plate of the gate capacitor is at 0V, and the positive plate of the gate capacitor is at a voltage of Vddd. During a first phase ($\Phi_1$), the SRGD is turned on and phase and slew controller 580 generates a control signal to enable pull-up path 672. The voltage on the gate of the synchronous rectifier FET increases from 0V to Vddd. During the first phase, the voltage on the positive and negative plates of the gate capacitor are not changed. In order to charge terminal 611 (SR_GDRV) of the gate driver (e.g., that is coupled to the gate of the synchronous rectifier FET) to Vddd, pull-up path 672 (vddd pull up) is enabled (e.g., turned on). While the voltage on terminal 611 is charged from 0V to Vddd, tracking comparator 584 compares the voltage on terminal 611 to the supply voltage Vddd. When the voltage on terminal 611 reaches Vddd, tracking comparator 584 indicates an end of the first phase and a beginning of a second phase.

During the second phase ($\Phi_2$), phase and slew controller 580 generates a control signal to disable (e.g., turn off) pull-up path 672 and pull-up path 661 and to enable pull-up path 662 in order to pull the negative plate (e.g., terminal 691) of the gate capacitor high. The voltage on the negative plate of the gate capacitor goes from 0V to Vddd, the voltage on the positive plate of the gate capacitor goes from Vddd to 2*Vddd, and the voltage on the gate of the synchronous rectifier FET on terminal 611 goes from Vddd to 2*Vddd. A path from boosted supply (SR_CPP) to the terminal 611 (e.g., SRGD output (SR_GDRV)) is turned on. The bias generator 585 (adaptive bias for boosted pull up) biases pull-up path 671, which charges the terminal 611 to 2*Vddd (boosted voltage supply). When the voltage on the terminal 611 reaches 2*Vddd, the tracking comparator 584 indicates and end of the second phase. The voltages on the negative plate of the gate capacitor, the positive plate of the gate capacitor, and the gate of the synchronous rectifier FET can be maintained until a third phase is enabled.

During the third phase ($\Phi_3$), the phase and slew controller 580 generates a control signal to enable pull-down path 663 in order to bring the positive plate of the gate capacitor from 2*Vddd to Vddd. Charge from the gate of the synchronous rectifier FET at terminal 611 is recycled back to the gate capacitor through pull-up path 671, and the gate of the synchronous rectifier FET goes from 2*Vddd to Vddd. The negative plate of the gate capacitor goes from Vddd to 0V. When the voltage on terminal 611 reaches Vddd (or almost reaches Vddd), tracking comparator 584 indicates an end of the third phase and a beginning of a fourth phase.

During the fourth phase ($\Phi_4$), phase and slew controller 580 generates a control signal to enable (e.g., turn on) pull-down path 673 in order to pull terminal 611 to ground (0V). Pull-up path 661 is enabled to recharge a loss in charge of the gate capacitor during the switching cycle. When the voltage on terminal 611 reaches 0V, tracking comparator 584 indicates an end of the fourth phase. The switching cycle may then be repeated.

Figure 8:
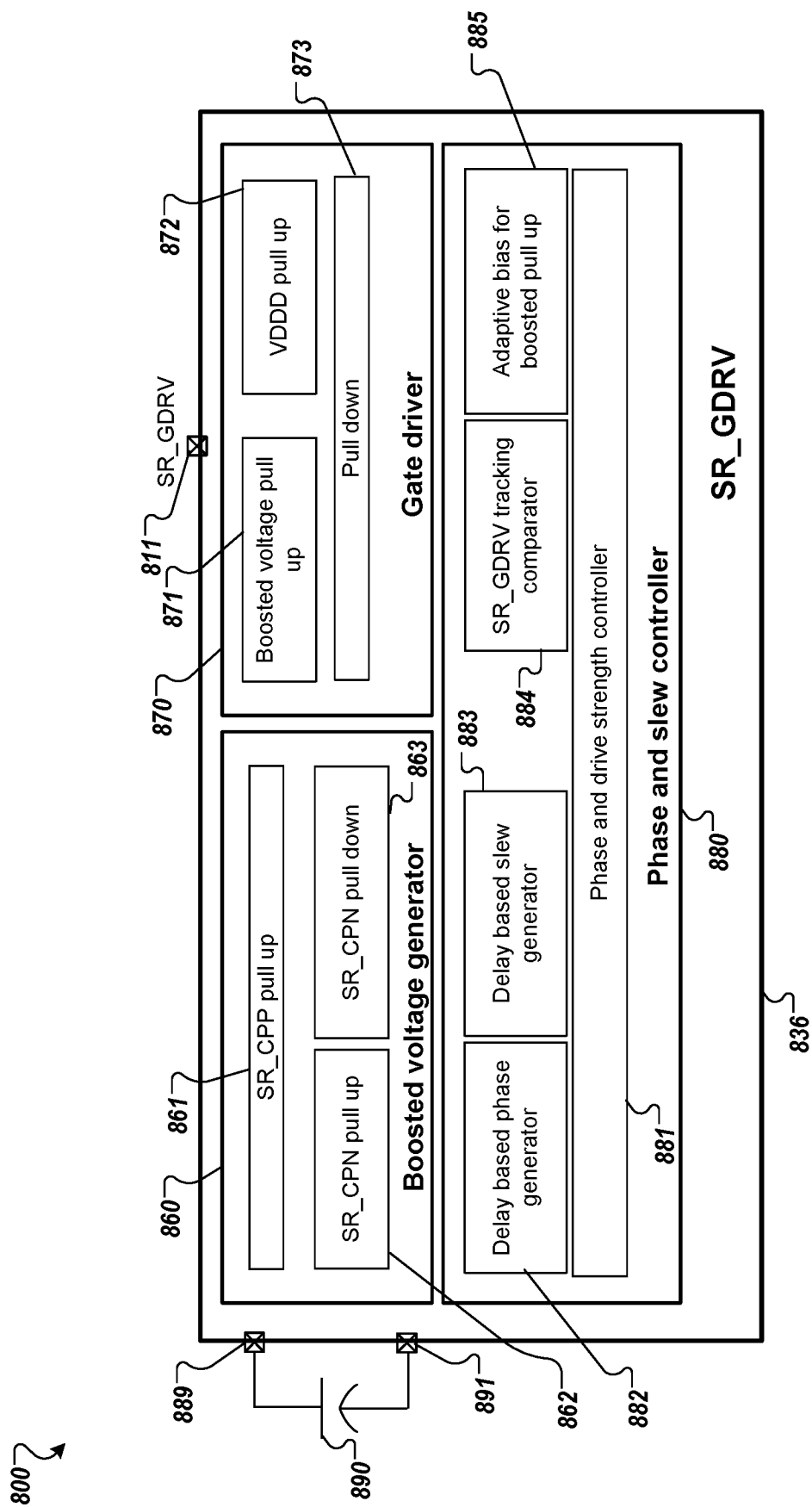
FIG. 8 is a block diagram of an SRGD with a delay-based phase generator integrated on a secondary-side controller in a secondary-controlled flyback converter according to one embodiment.

FIG. 8 is a block diagram of an SRGD 836 with a delay-based phase generator 882 integrated on a secondary-side controller in a secondary-controlled flyback converter according to one embodiment. Although not all components of the secondary-controlled flyback converter are shown, the secondary-controlled flyback converter is similar to the secondary-controlled flyback converter of the USB-PD power adapter of FIG. 1, as noted by similar reference numbers. The depicted embodiment illustrates an architecture for a secondary-side gate driver (e.g., SRGD 836) that consumes little power and is reliable. SRGD 836 can generate an output voltage that is double the supply voltage of the chip (Vddd). SRGD 836 includes boosted voltage generator circuit 860, gate driver circuit 870, and phase and slew controller circuit 880. SRGD 836 is coupled to gate capacitor 890 via terminals 889 and 891 and a gate of a synchronous rectifier FET (not shown in FIG. 8) via terminal 811. The combination of boosted voltage generator circuit 860, gate driver circuit 870, and phase and slew controller circuit 880 is configured to generate the boosted voltage on terminal 811 of the synchronous rectifier FET.

The boosted voltage generator circuit 860 is responsible for generating the boosted voltage supply (2*Vddd) on a first terminal 889 (SR_CPP) of gate capacitor 890. The boosted voltage generator circuit drives gate capacitor 890 and uses a bootstrapping principle to generate the boosted voltage supply on the first terminal 889 (SR_CPP) of gate capacitor 890. In one embodiment, gate capacitor 890 may have a capacitance of 100 nF. The boosted voltage generator circuit 860 includes a first pull-up path 861, a second pull-up path 862, and a pull-down path 863.

The gate driver circuit 870 is configured to drive the synchronous rectifier FET (not shown in FIG. 8). The gate driver circuit 870 includes a first pull-up path 871, a second pull-up path 872, and a pull-down path 873.

The phase and slew controller circuit 880 is configured to generate control signals for different phases of operation of SRGD 836 and is further configured to generate a required slew for SRGD 836. The phase and slew controller circuit generates control signals for different phases of operation by tracking the voltage level on terminal 811 of the synchronous rectifier FET. In one embodiment, in order to track the voltage level on terminal 811 of the synchronous rectifier FET, the phase and slew controller circuit measures a voltage on the gate of the synchronous rectifier FET and compares it to the supply voltage (Vddd) of the IC. The comparing may be done by a comparator, such as tracking comparator 884. The phase and slew controller circuit 880 includes phase and drive strength controller 881, delay-based phase generator 882, a slew generator 883, the tracking comparator 884, and a bias generator 888.

Operation of SRGD 800 may be similar to operation of SRGD 500 of FIG. 5, but instead of tracking the voltage on terminal 811 and comparing it to a supply voltage (Vddd) using a high-speed comparator (such as tracking comparator 884), a time-based approach can be used. In this embodiment, the generation of control signals by phase and slew controller 880 does not depend on a response of tracking comparator 884. The control signal to switch between the second phase and the third phase is generator after a fixed time delay defined by delay-based phase generator 882.

Figure 9:
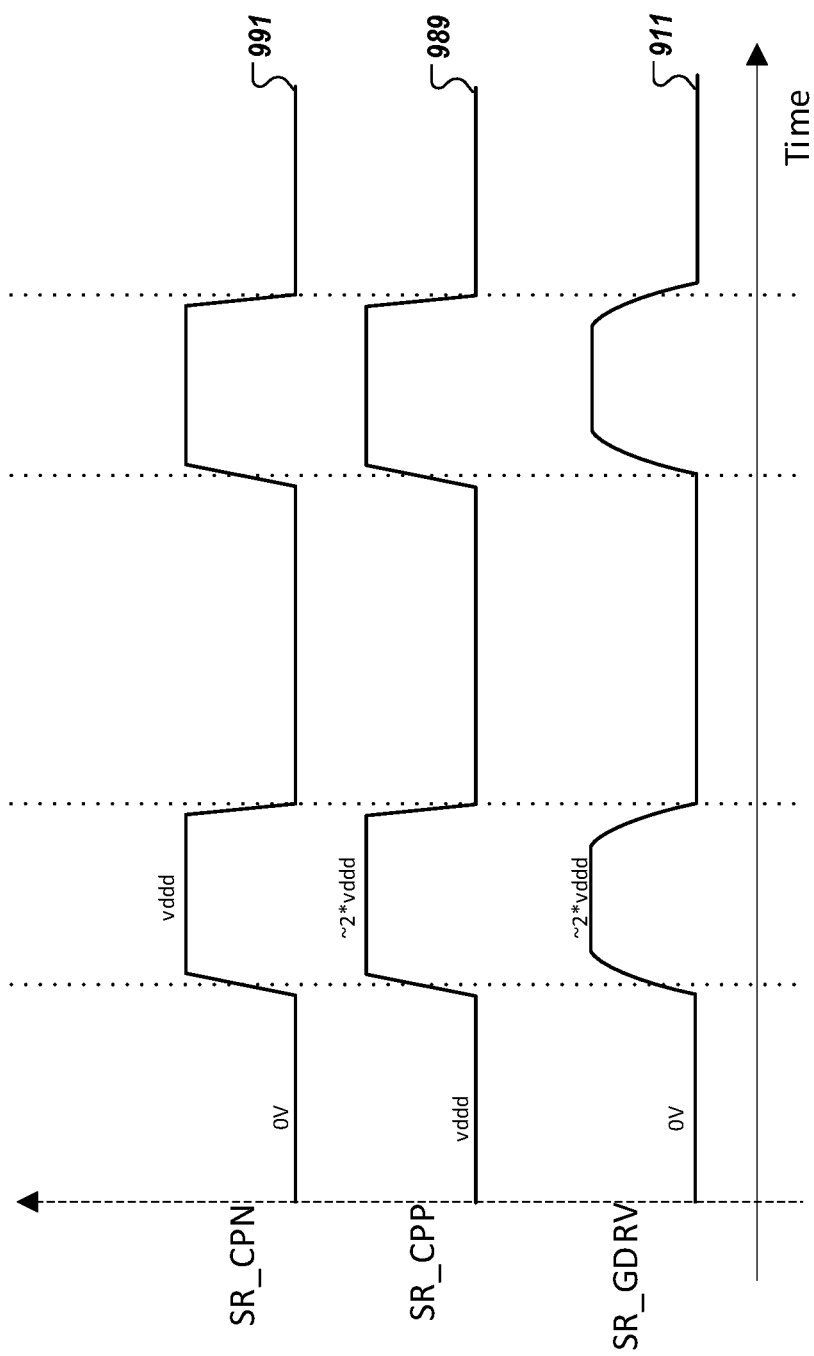
FIG. 9 is a timing diagram illustrating voltages on a gate capacitor and a gate of a synchronous rectifier FET during operation of an SRGD with a delay-based phase generator integrated on a secondary-side controller of a USB-PD power adapter according to one embodiment.

FIG. 9 is a timing diagram illustrating voltages on a gate capacitor and a gate of a synchronous rectifier FET during operation of an SRGD with a delay-based phase generator integrated on a secondary-side controller of a USB-PD power adapter according to one embodiment. The illustrated timing diagrams 991, 989, and 911 of the voltages on the negative plate of the gate capacitor, the positive plate of the gate capacitor, and the gate of the synchronous rectifier FET, respectively, are shown. A gate capacitor (e.g., gate capacitor 190 of FIG. 1 or gate capacitor 890 of FIG. 8) may be charged and discharged in phases where the phase change depends on a fixed time. In one embodiment, phases may be enabled for an amount of time that does not depend on relative voltage between the gate of the synchronous rectifier FET and the supply voltage (Vddd). In one embodiment, a first phase may be enabled for a fixed amount of time that does not depend on relative voltage between the gate of the synchronous rectifier FET and the supply voltage (Vddd) but can be programmed based on the synchronous rectifier gate capacitance. The gate driver will be can be in phase one for this duration of delay, and the delay based phase generator generates a control signal for entering the second phase when the timer completes the delay at which point the gate driver enters a second phase. In the second phase the negative plate (SR_CPN) of the gate capacitor is charged to Vddd level, the positive plate (SR_CPP) of the gate capacitor is charged to 2*Vddd level, and the gate of the synchronous rectifier FET is charged to 2*Vddd level. Similarly during a discharge phase (e.g., third phase) SR_CPN is pulled down to ground and the charge is recycled back from gate of synchronous rectifier FET to SR_CPP until the delay based phase generator generates a control signal for entering a fourth phase, where the pull-down path on the synchronous rectifier FET gate is enabled to pull it down to ground. The delay that is set for changing phases is programmable and can be set depending on the capacitance of the attached synchronous rectifier FET. In some embodiments, the negative plate may reach 0V, the positive plate may reach Vddd, and the gate of the synchronous rectifier FET may reach 0V at the same time. The negative plate (SR_CPN) of the gate capacitor is pulled high when the SRGD needs to go into a high state (e.g., provide power).

Figure 10:
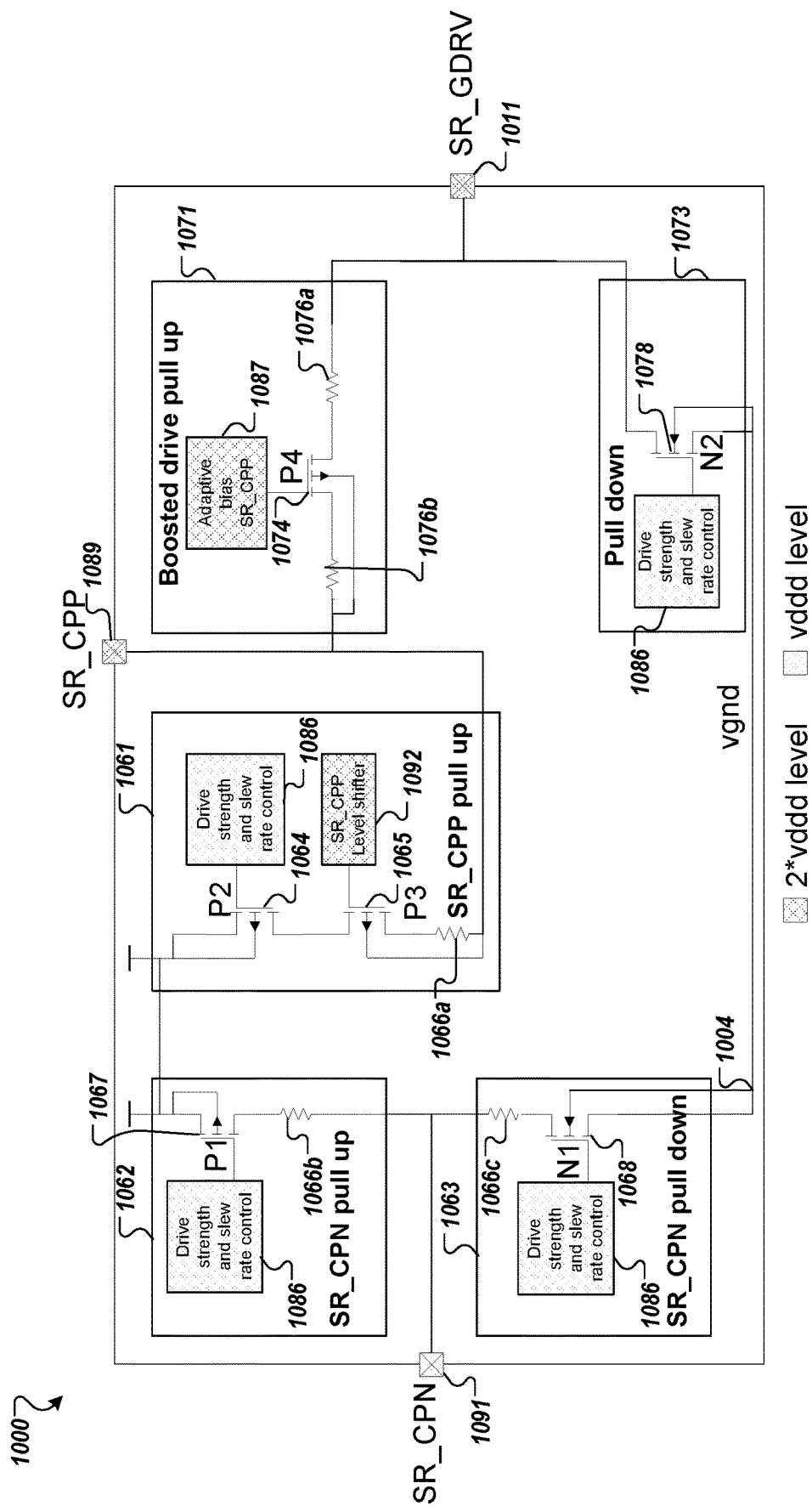
FIG. 10 is a block diagram of an implementation of a boosted voltage generator circuit and a gate driver circuit with one pull-up path coupled to a phase and slew rate controller circuit of an SRGD integrated on a secondary-side controller in a secondary-controlled flyback converter according to one embodiment.

FIG. 10 is a block diagram of an implementation of a boosted voltage generator circuit and a gate driver circuit with one pull-up path coupled to a phase and slew rate controller circuit of an SRGD integrated on a secondary-side controller in a secondary-controlled flyback converter according to one embodiment. Although not all components of the secondary-controlled flyback converter are shown, the secondary-controlled flyback converter is similar to the secondary-controlled flyback converter of the USB-PD power adapter of FIG. 1, as noted by similar reference numbers.

The voltage generator circuit includes a pull-up path 1061, pull-up path 1062, and pull-down path 1063. Pull-up path 1061 is coupled to terminal 1089 of a gate capacitor (e.g., gate capacitor 190 of FIG. 1, not shown in FIG. 10). Pull-up path 1061 is further coupled to pull-up path 1062. Pull-up path 1062 is coupled to terminal 1091 of the gate capacitor (e.g., gate capacitor 190 of FIG. 1, not shown in FIG. 10). Pull-down path 1063 is coupled between terminal 1091 of the gate capacitor and node 1004. Node 1004 is at a voltage level Vgnd, which is lower than Vddd.

The gate driver circuit includes pull-up path 1071 and pull-down path 1073. The pull-up path 1071 is coupled between terminal 1089 of the gate capacitor and a terminal 1011 of a synchronous rectifier FET (e.g., synchronous rectifier FET 112 of FIG. 1, not shown in FIG. 10).

A pull-up path, such as the pull-up paths 1061, 1062, and 1071 may be circuitry to provide a low resistance path to a node (at the Vddd voltage level) when enabled, and a high resistance path to the node (at the Vddd voltage level) when disabled. Pull-up paths 1061, 1062, and 1071 may be enabled or disabled using switches, FETs, MOSFETs, or the like. A pull-down path, such as the pull-down paths 1063 and 1073, may be circuitry to provide a low resistance path to the node 1004 (at the Vgnd voltage level) when enabled, and a high resistance path to node 1004 when disabled. Pull-down paths 1063 and 1073 may be enabled or disabled using switches, FETs, MOSFETs, or the like. Control signals to enable or disable pull-up paths and pull-down paths of the SRGD may be provided from the phase and slew controller.

Pull-up path 1061 (SR_CPP pull up) includes switch 1064 (P2) coupled to drive strength and slew rate controller 1086. In one embodiment, switch 1064 may be a p-channel FET (pFET). Referring back to FIG. 5, the drive strength and slew rate controller may include phase and drive strength controller 581, current generator 582, and slew generator 583. The drive strength and slew rate controller 1087 may provide control signals to enable or disable (e.g., switch on or switch off; or turn on or turn off) switch 1064. Switch 1064 is coupled to switch 1065 (P3). Switch 1065 is coupled to level shifter 1092. In one embodiment the level shifter is a SR_CPP level shifter. In some embodiments, level shifter 1092 may be a logic-level shifter or a voltage level translator. In some embodiments, level shifter 1092 may be a unidirectional level shifter or a bi-directional level shifter. Switch 1065 is coupled to resistor 1066a, and resistor 1066a is coupled to terminal 1089 (SR_CPP) of the gate capacitor.

Pull-up path 1062 (SR_CPN pull up) includes switch 1067 (P1) coupled to drive strength and slew rate controller 1086, which may provide the control signals to enable or disable the switch 1067. Resistor 1066b is coupled between switch 1067 and terminal 1091 (SR_CPN) of the gate capacitor.

Pull-down path 1063 (SR_CPN pull down) includes resistor 1066c coupled between terminal 1091 of the gate capacitor and switch 1068 (N1). Switch 1068 is coupled to drive strength and slew rate controller 1086, which may provide the control signals to enable or disable switch 1068. Switch 1068 is further coupled to node 1004 at the Vgnd voltage level. In some embodiments, switch 1068 may be an n-channel FET (nFET).

Pull-up path 1071 (boosted drive pull up) includes resistor 1076a coupled between terminal 1011 (SR_GDRV) coupled to the gate of the synchronous rectifier FET and switch 1074 (P4). Switch 1074 is coupled to adaptive bias controller 1087 (adaptive bias SR_CPP). Referring back to FIG. 5, adaptive bias controller 1087 includes an adaptive bias generator (e.g., phase and drive strength controller 581 and bias generator 585). The adaptive bias controller 1087 is to send control signals to enable or disable (e.g., turn on or turn off) switch 1074. Resistor 1076b is coupled between the terminal 1089 of the gate capacitor and switch 1074.

Pull-down path 1073 (pull down) includes switch 1078 (N2) coupled to terminal 1011 of the synchronous rectifier FET and drive strength and slew rate controller 1086. The drive strength and slew rate controller 1086 may provide the control signals to enable or disable switch 1078. Switch 1078 is further coupled to node 1004 at the Vgnd voltage level.

Switches 1064, 1065, 1067, 1068, 1074, and 1078 may be n-channel FETs (nFETs), p-channel FETs (pFETs), bipolar transistors, or the like, or any combination of different types of switches. The drive strength and slew rate controller 1086 may be at the Vddd voltage level. The level shifter 1092 and the adaptive bias controller 1087 may be at 2*Vddd voltage level (e.g., at a voltage level which is twice the Vddd voltage level). The adaptive bias controller is to send control signals to enable or disable (e.g., turn on or turn off) the switches (e.g., by generating a voltage at the gate of the switch in order to minimize the peak current and to meet rise and fall time requirements of the gate driver (SRGD)).

Referring back to FIG. 5, phase and slew controller circuit 580 is to generate control signals to enable or disable pull-up paths 1061, 1062, and 1071 and to enable or disable pull-down paths 1063 and 1073. By enabling or disabling pull-up paths 1061, 1062, and 1071, and pull-down paths 1063 and 1073, phase and slew controller circuit 580 can controller the SRGD to operate in one of a first phase, a second phase, a third phase, or a fourth phase in order to implement a synchronous switching scheme with adaptive slew rate control to adiabatically charge and discharge gate capacitor 590 and to generate a boosted voltage (e.g., 2*Vddd) at terminal 511 of the synchronous rectifier FET.

In the embodiment depicted in FIG. 10, the gate capacitor can supply charge to the gate of the synchronous rectifier FET at the terminal 1011 during a first phase and a second phase. Since there is only one pull-up path in the gate driver circuit, the area of the SRGD may be reduced which allows for reduced bill of material (BOM).

Figure 11:
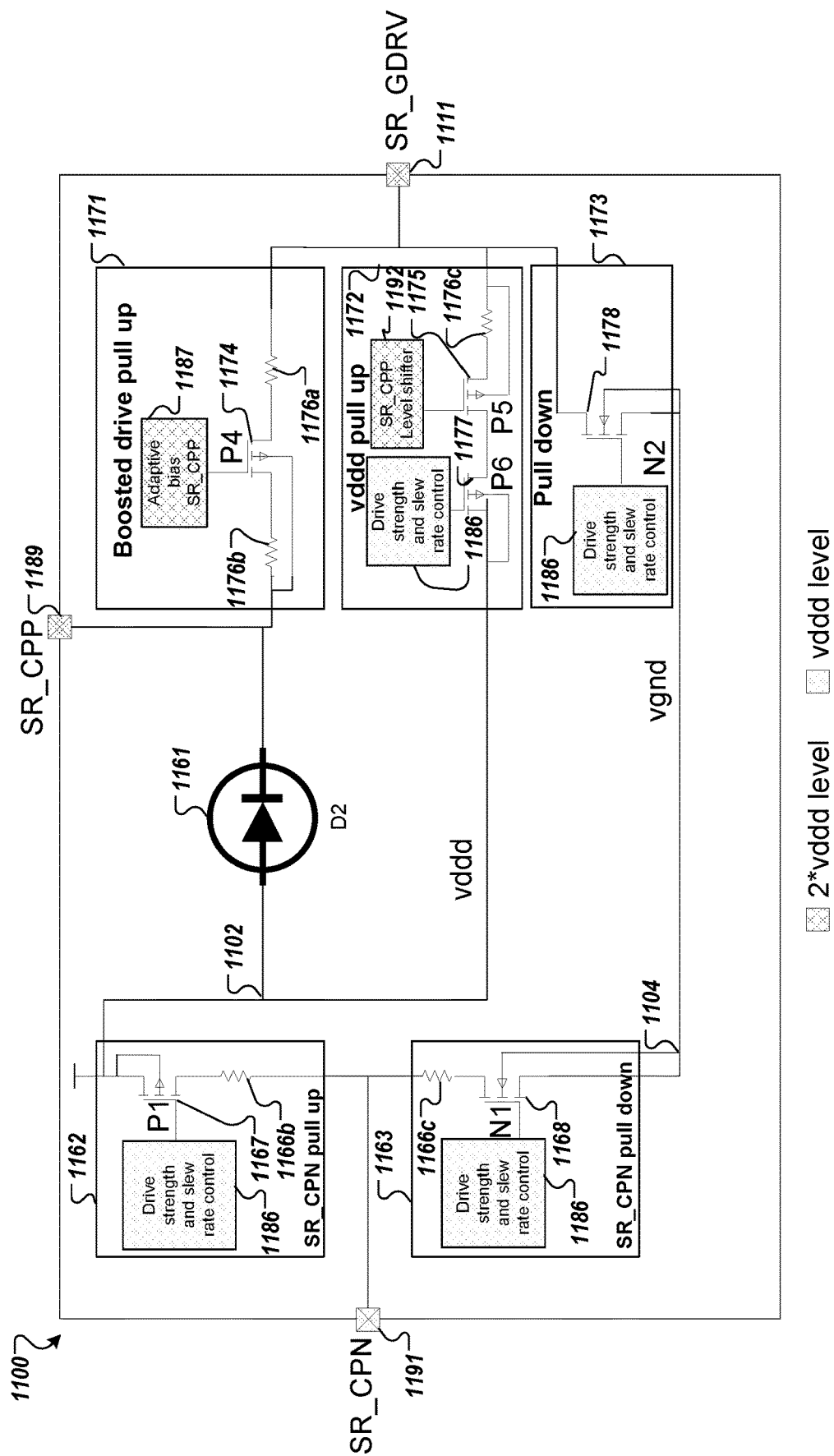
FIG. 11 is a block diagram of an implementation of a boosted voltage generator circuit and a gate driver circuit coupled to a phase and slew rate controller circuit of an SRGD with a diode integrated on a secondary-side controller in a secondary-controlled flyback converter according to one embodiment.

FIG. 11 is a block diagram of an implementation of a boosted voltage generator circuit and a gate driver circuit coupled to a phase and slew rate controller circuit of an SRGD with a diode integrated on a secondary-side controller in a secondary-controlled flyback converter according to one embodiment. Although not all components of the secondary-controlled flyback converter are shown, the secondary-controlled flyback converter is similar to the secondary-controlled flyback converter of the USB-PD power adapter of FIG. 1, as noted by similar reference numbers.

The voltage generator circuit includes a diode 1161, pull-up path 1162, and pull-down path 1163. Diode 1161 is coupled to plate 1189 of a gate capacitor (e.g., gate capacitor 190 of FIG. 1, not shown in FIG. 11). Diode 1161 is further coupled to node 1102 at a voltage level Vddd. Node 1102 is coupled between pull-up path 1162 and diode 1161. Pull-up path 1162 is coupled between node 1102 and to terminal 1191 of the gate capacitor (e.g., gate capacitor 190 of FIG. 1, not shown in FIG. 11). Pull-down path 1163 is coupled between terminal 1191 of the gate capacitor and node 1104. Node 1104 is at a voltage level Vgnd, which is lower than Vddd.

The gate driver circuit includes pull-up path 1171, pull-up path 1172, and pull-down path 1173. Pull-up path 1171 is coupled between terminal 1189 of the gate capacitor and a terminal 1111 of a synchronous rectifier FET (e.g., synchronous rectifier FET 112 of FIG. 1, not shown in FIG. 11). Pull-up path 1172 is coupled to pull-up path 1171 and is further coupled between node 1102 and terminal 1111 of the synchronous rectifier FET. Pull-down path 1173 is coupled to pull-up path 1172 and to node 1104.

A pull-up path, such as the pull-up paths 1162, 1171, and 1172, may be circuitry to provide a low resistance path to node 1102 (at the Vddd voltage level) when enabled, and a high resistance path to node 1102 when disabled. Pull-up paths 1162, 1171, and 1172 may be enabled or disabled using switches, FETs, MOSFETs, or the like. A pull-down path, such as pull-down paths 1163 and 1173, may be circuitry to provide a low resistance path to node 1104 (at the Vgnd voltage level) when enabled, and a high resistance path to node 1104 when disabled. Pull-down paths 1163 and 1173 may be enabled or disabled using switches, FETs, MOSFETs, or the like. Control signals to enable or disable pull-up paths and pull-down paths of the SRGD may be provided from the phase and slew controller.

Pull-up path 1162 (SR_CPN pull up) includes switch 1167 (P1) coupled to node 1102. Switch 1167 is further coupled to drive strength and slew rate controller 1186, which may provide the control signals to enable or disable switch 1167. Resistor 1166b is coupled between switch 1167 and terminal 1191 (SR_CPN) of the gate capacitor.

Pull-down path 1163 (SR_CPN pull down) includes resistor 1166c coupled between terminal 1191 of the gate capacitor and switch 1168 (N1). Switch 1168 is coupled to drive strength and slew rate controller 1186, which may provide the control signals to enable or disable switch 1168. Switch 1168 is further coupled to node 1104 at the Vgnd voltage level. In some embodiments, switch 1168 may be an n-channel FET (nFET).

Pull-up path 1171 (boosted drive pull up) includes resistor 1176a coupled between terminal 1111 (SR_GDRV) of the synchronous rectifier FET and switch 1174 (P4). Switch 1174 is coupled to adaptive bias controller 1187 (adaptive bias SR_CPP). Referring back to FIG. 5, the adaptive bias controller 1187 includes phase and drive strength controller 581 and bias generator 585. The adaptive bias controller 1187 is to send control signals to enable or disable (e.g., turn on or turn off) the switch 1174. Resistor 1176b is coupled between plate 1189 of the gate capacitor and switch 1174.

Pull-up path 1172 (vddd pull up) includes resistor 1176c coupled between terminal 1111 of the synchronous rectifier FET and switch 1175 (P5). Switch 1175 is coupled to level shifter 1192. Switch 1175 is coupled to switch 1177 (P6). Switch 1177 is coupled to drive strength and slew rate controller 1186, which may provide the control signals to enable or disable switch 1177. Switch 1177 is further coupled to node 1102 at the voltage level Vddd.

Pull-down path 1173 (pull down) includes switch 1178 (N2) coupled to terminal 1111 of the synchronous rectifier FET and drive strength and slew rate controller 1186. The drive strength and slew rate controller may provide the control signals to enable or disable switch 1178. Switch 1178 is further coupled to node 1104 at the Vgnd voltage level.

Switches 1167, 1168, 1174, 1175, 1177, and 1178 may be n-channel FETs (nFETs), p-channel FETs (pFETs), bipolar transistors, or the like, or any combination of different types of switches. Drive strength and slew rate controller 1186 may be at the Vddd voltage level. Level shifter 1192 and adaptive bias controller 1187 may be at 2*Vddd voltage level (e.g., at a voltage level which is twice the Vddd voltage level).

Referring back to FIG. 5, phase and slew controller circuit 580 is to generate control signals to enable or disable pull-up paths 1162, 1171, and 1172, to enable or disable pull-down paths 1163 and 1173, and to enable or disable diode 1161. By enabling or disabling pull-up paths 1162, 1171, and 1172, pull-down paths 1163 and 1173, and diode 1161, phase and slew controller circuit 580 can controller the SRGD to operate in one of a first phase, a second phase, a third phase, or a fourth phase in order to implement a synchronous switching scheme with adaptive slew rate control to adiabatically charge and discharge gate capacitor 590 and to generate a boosted voltage (e.g., 2*Vddd) at terminal 511 of the synchronous rectifier FET.

In one embodiment, diode 1161 can be disposed internal to the SRGD. In another embodiment, the diode can be disposed externally from the SRGD, such as on the circuit board with the supply voltage (Vddd) circuitry. Referring to FIG. 6, by using a diode in place of pull-up path 661 (SR_CPP pull up), the area of the board can be reduced.

Figure 12A:
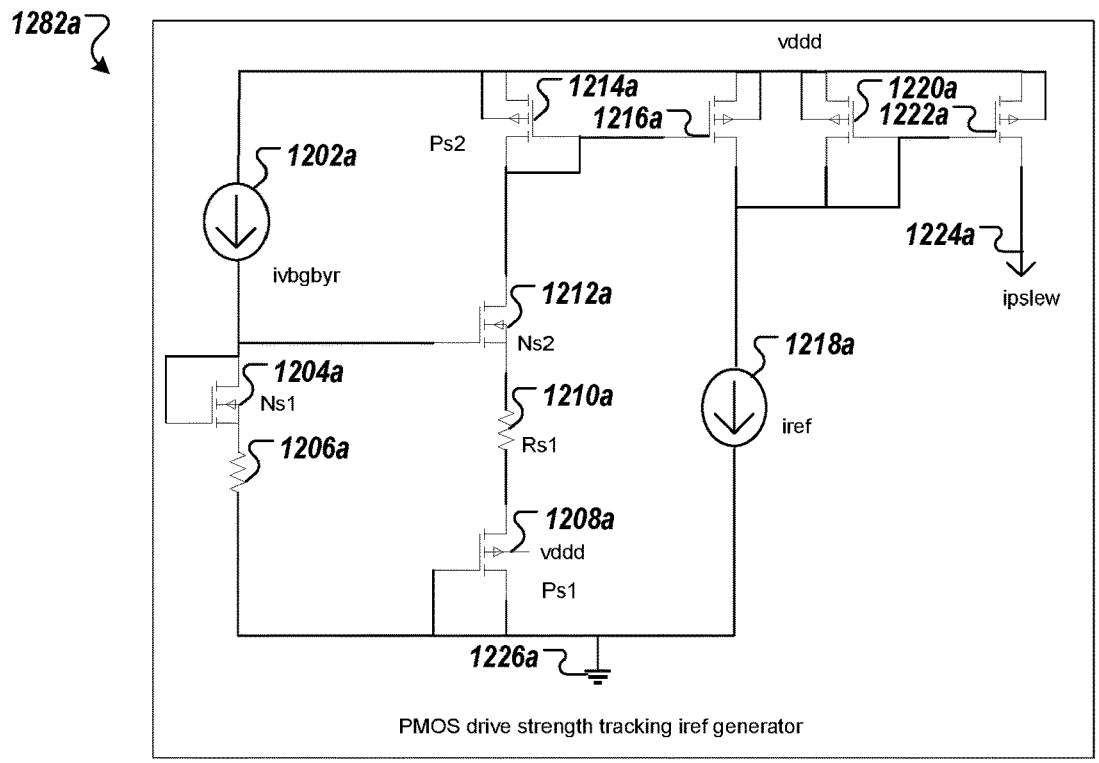
FIG. 12A is a schematic diagram of a p-type metal-oxide semiconductor (PMOS) drive strength tracking current generator according to one embodiment.

FIG. 12A is a schematic diagram of a p-type metal-oxide semiconductor (PMOS) drive strength tracking current generator 1282a according to one embodiment. Referring back to FIG. 5, the PMOS drive strength tracking current generator 1282a may be current generator 582. The PMOS drive strength tracking current generator 1282a includes current source 1202a (which may be a complementary to absolute temperature (CTAT) current source in which the current decreases with temperature) coupled to switch 1204a. The switch 1204a is coupled to resistor 1206a. Switch 1208a is coupled between the resistor 1206a, ground potential 1226a and resistor 1210a. Switch 1212a is coupled to the resistor 1210a. Switch 1214a is coupled to the switch 1212a. Switch 1216a is coupled between the switch 1214a and a current source 1218a. Current source 1218a may be a reference current source (which may be a current source in which the current is constant with respect to temperature). Switch 1220a is coupled to the switch 1216a. Switch 1222a is coupled to switch 1220a. An output of the PMOS drive strength tracking current generator 1282a may be current 1224a.

In one embodiment, the PMOS drive strength tracking current generator 1282a may be coupled to pull-up paths 661, 662, and 672 of FIG. 6. In one embodiment, the PMOS drive strength tracking current generator 1282a may be coupled to switches 664, 667, and 677 of FIG. 6. In one embodiment, the PMOS drive strength tracking current generator 1282a may be coupled to pull-up paths 1061 and 1062 of FIG. 10. In one embodiment, the PMOS drive strength tracking current generator 1282a may be coupled to switches 1064 and 1067 of FIG. 10. In one embodiment, the PMOS drive strength tracking current generator 1282a may be coupled to pull-up paths 1162 and 1172 of FIG. 11. In one embodiment, the PMOS drive strength tracking current generator 1282a may be coupled to switches 1167 and 1186 of FIG. 11.

The drive strength tracking current generator 1282a may be used to generate current 1224a. The drive strength tracking current generator 1282a tracks a drive strength of the SRGD pull-up circuits (such as pull-up elements 661, 662, and 672 of FIG. 6; pull-up elements 1061 and 1062 of FIG. 10; or pull-up elements 1162, and 1172 of FIG. 11). The drive strength tracking current generator 1282a tracks the drive strength of switches corresponding to pull-up elements (such as switches 664, 667, 674, and 677 of FIG. 6; switches 1065 and 1067 of FIG. 10; or 1167, 1174, and 1186 of FIG. 11), and generates current 1224a which may be inversely proportional to the drive strength. The current 1224a may be used to generate a delay (e.g., by a delay-based slew generator described in more detail in FIG. 13). In one embodiment, a higher current may result in less (e.g., lower) delay for a slower process corner and a lower current may result in more (e.g., higher) delay for a faster process corner. The drive strength tracking current generator 1282a combined with a delay-based slew generator, described in further detail in FIG. 13A, form an adaptive slew control circuit that may be coupled to boosted voltage generator circuit 560 and gate drive circuit 570 of FIG. 5 in order to adaptively control the slew rate. The current 1224a used to generate the delay is $$ipslew = iref - k1 * \frac{vref - vtp}{Rs1}$$

where vtp is a PMOS threshold voltage, k1 is a current copying gain, and Rs1 is a resistance of resistor 1210a. It should be noted that in other embodiments, and with slight modifications, a higher current may result in more (e.g., higher) delay while a lower current may result in less delay.

Figure 12B:
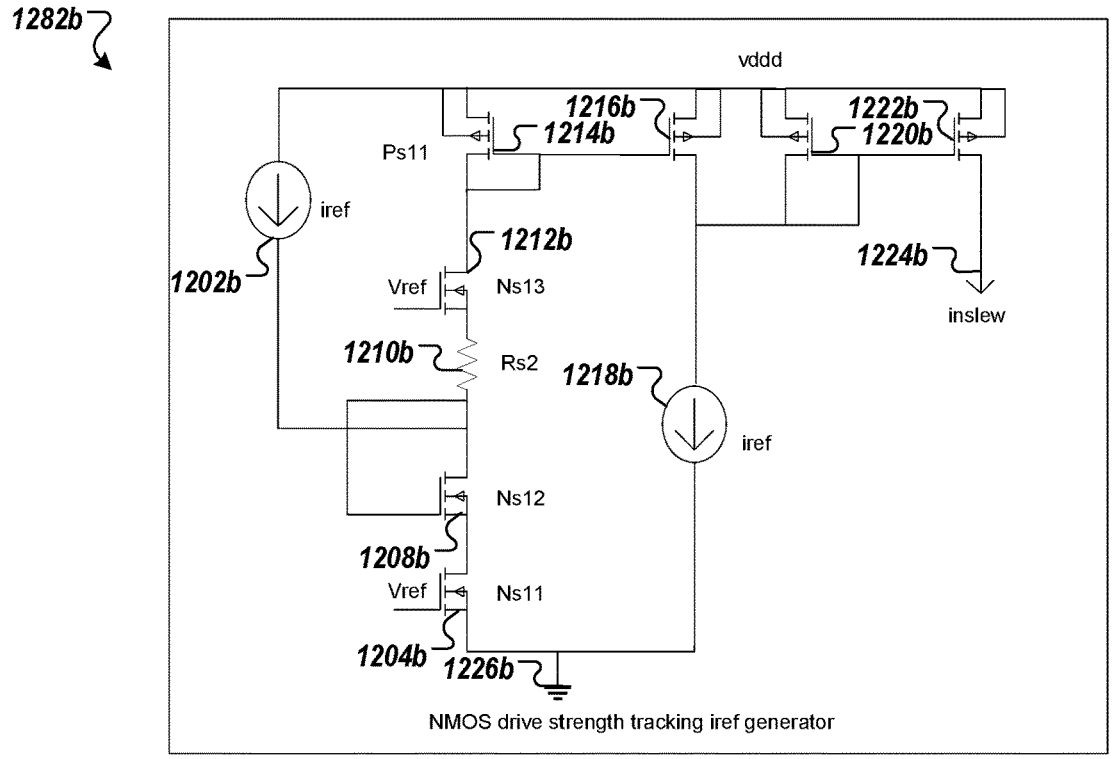
FIG. 12B is a schematic diagram of an n-type metal-oxide semiconductor (NMOS) drive strength tracking current generator according to one embodiment.

FIG. 12B is a schematic diagram of an n-type metal-oxide semiconductor (NMOS) drive strength tracking current generator 1282b according to one embodiment. Referring back to FIG. 5, the NMOS drive strength tracking current generator 1282b may be current generator 582. The NMOS drive strength tracking current generator 1282b includes current source 1202b coupled to switch 1214b. Switch 1214b is coupled to switch 1212b. Switch 1212b is coupled to resistor 1210b. Resistor 1210b is coupled to switch 1208b. Switch 1208b is coupled to switch 1204b. Switch 1204b is coupled to a ground potential 1226b. Switch 1214b is further coupled to switch 1216b. Switch 1216b is coupled to current source 1218b. The current source 1218b may be a reference current source (e.g., a current source which is constant with respect to temperature). Switch 1216b is coupled to switch 1220b. Switch 1220b is coupled to switch 1222b. An output of the NMOS drive strength tracking current generator 1282b may be current 1224b.

In one embodiment, the NMOS drive strength tracking current generator 1282b may be coupled to pull-down paths 663 and 673 of FIG. 6. In one embodiment, the NMOS drive strength tracking current generator 1282a may be coupled to switches 668 and 678 of FIG. 6. In one embodiment, the NMOS drive strength tracking current generator 1282b may be coupled to pull-down paths 1063 and 1073 of FIG. 10. In one embodiment, the NMOS drive strength tracking current generator 1282a may be coupled to switches 1068 and 1078 of FIG. 10. In one embodiment, the NMOS drive strength tracking current generator 1282b may be coupled to pull-down paths 1163 and 1173 of FIG. 11. In one embodiment, the NMOS drive strength tracking current generator 1282a may be coupled to switches 1168 and 1178 of FIG. 11.

The drive strength tracking current generator 1282b may be used to generate current 1224b. The drive strength tracking current generator 1282b tracks a drive strength of SRGD pull-down circuits (such as pull-down elements 663 and 673 of FIG. 6; pull-down elements 1063 and 1073 of FIG. 10; or pull-down elements 1163 and 1173 of FIG. 11). The drive strength tracking current generator 1282b tracks the drive strength of switches corresponding to pull-down elements (such as switches 668 and 678 of FIG. 6; switches 1068 and 1078 of FIG. 10; or 1168 and 1178 of FIG. 11), and generates current 1224b which may be inversely proportional to the drive strength. Current 1224b may be used to generate a delay (e.g., by a delay-based slew generator described in more detail in FIG. 13). In one embodiment, a higher current may result in less (e.g., lower) delay for a slower process corner and a lower current may result in more (e.g., higher) delay for a faster process corner. The drive strength tracking current generator 1282b combined with a delay-based slew generator, described in further detail in FIG. 13B, form an adaptive slew control circuit that may be coupled to boosted voltage generator circuit 560 and gate drive circuit 570 of FIG. 5 in order to adaptively control the slew rate. The current 1224b used to generate the delay is $$inslew = iref - k2 * \frac{vref - 2*vtn}{Rs2 + Rdson\_Ns11}$$

where vtn is an NMOS threshold voltage, k2 is a current copying gain, Rs2 is a resistance of the resistor 1210b, and Rdson_Ns11 is an on-resistance of switch 1204b (e.g., linear MOSFET NS11).

Figure 13A:
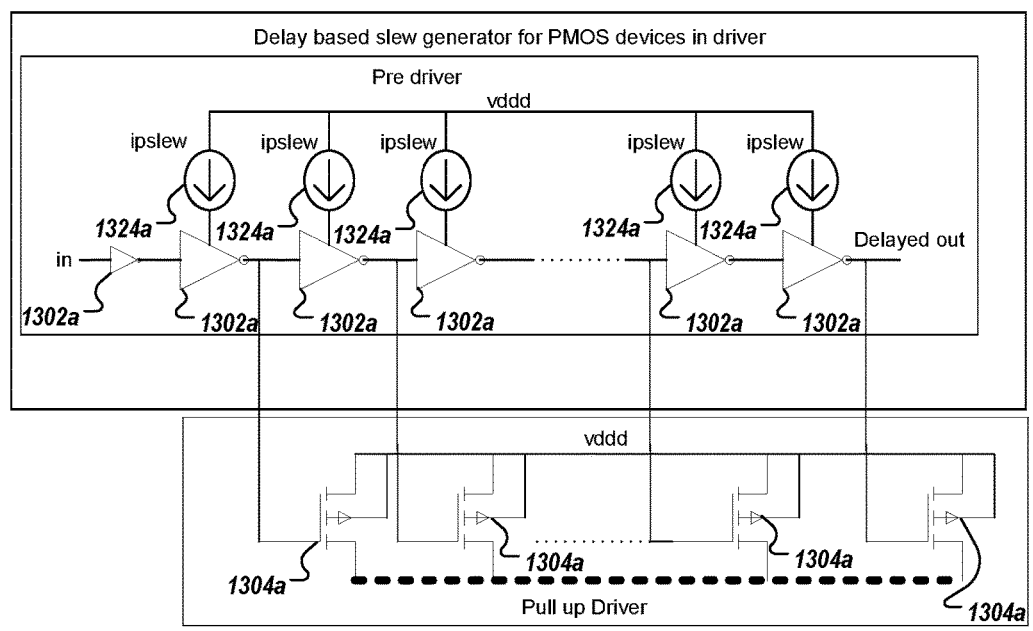
FIG. 13A is a schematic diagram of a delay-based slew generator for PMOS devices according to one embodiment.

FIG. 13A is a schematic diagram of a delay-based slew generator 1383a for PMOS devices according to one embodiment. The delay-based slew generator 1383a is coupled to a series of MOSFET legs 1304a. In one embodiment, MOSFET legs may be pFETs. Current 1324a is input into delay-based slew generator 1383a. In one embodiment, current 1324a may be current 1224a of FIG. 12. In another embodiment, current 1324a may be a current generated by an external component. A current source of current 1324a is coupled to a series of current-starved inverters 1302a (e.g., current inverters). Current-starved inverters 1302a may be coupled to each other in a cascaded pattern. The reference current 1342a in the current-starved inverters 1302a may determine a delay. To control a slew rate of a driver, MOSFET legs 1304a are turned on and off based on the delay generated by the delay-based slew generator.

In one embodiment, delay-based slew generator 1383a may be coupled to the PMOS drive strength tracking current generator 1282a. The delay-based slew generator coupled to the PMOS drive strength tracking current generator 1282a forms drive strength and slew rate controller 686 of FIG. 6. In one embodiment, delay-based slew generator 1383a may be coupled to pull-up paths 661, 662, and 672 of FIG. 6. In one embodiment, delay-based slew generator 1383a may be coupled to switches 664, 667, and 677 of FIG. 6. In one embodiment, delay-based slew generator 1383a may be coupled to pull-up paths 1061 and 1062 of FIG. 10. In one embodiment, delay-based slew generator 1383a may be coupled to switches 1064 and 1067 of FIG. 10. In one embodiment, the delay-based slew generator 1383a may be coupled to pull-up paths 1162 and 1172 of FIG. 11. In one embodiment, the delay-based slew generator 1383a may be coupled to switches 1167 and 1186 of FIG. 11.

Figure 13B:
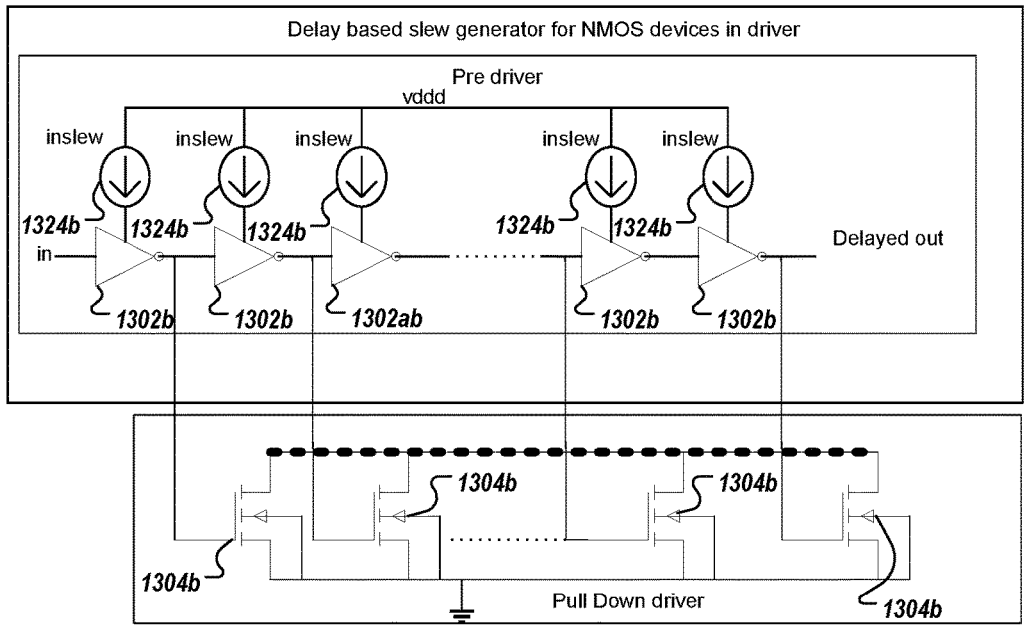
FIG. 13B is a schematic diagram of a delay-based slew generator for NMOS devices according to one embodiment.

FIG. 13B is a schematic diagram of a delay-based slew generator 1383b for NMOS devices according to one embodiment. The delay-based slew generator 1383b is coupled to a series of MOSFET legs 1304b. In one embodiment, MOSFET legs may be nFETs. Current 1324b is input into the delay-based slew generator 1383b. In one embodiment, current 1324b may be current 1224b of FIG. 12. In another embodiment, current 1324b may be a current generated by an external component. A current source of current 1324b is coupled to a series of current-starved inverters 1302b. The current-starved inverters 1302b may be coupled to each other in a cascaded pattern. The reference current 1342b in current-starved inverters 1302b may determine a delay. To control a slew rate of a driver, MOSFET legs 1304b are turned on and off based on the delay generated by the delay-based slew generator.

In one embodiment, delay-based slew generator 1383b may be coupled to the NMOS drive strength tracking current generator 1282b. The delay-based slew generator coupled to the NMOS drive strength tracking current generator 1282b forms drive strength and slew rate controller 686 of FIG. 6. In one embodiment, delay-based slew generator 1383b may be coupled to pull-down paths 663 and 673 of FIG. 6. In one embodiment, delay-based slew generator 1383b may be coupled to switches 668 and 678 of FIG. 6. In one embodiment, delay-based slew generator 1383b may be coupled to pull-down paths 1063 and 1073 of FIG. 10. In one embodiment, delay-based slew generator 1383b may be coupled to switches 1068 and 1078 of FIG. 10. In one embodiment, the delay-based slew generator 1383b may be coupled to pull-down paths 1163 and 1173 of FIG. 11. In one embodiment, delay-based slew generator 1383b may be coupled to switches 1168 and 1178 of FIG. 11.

Figure 14:
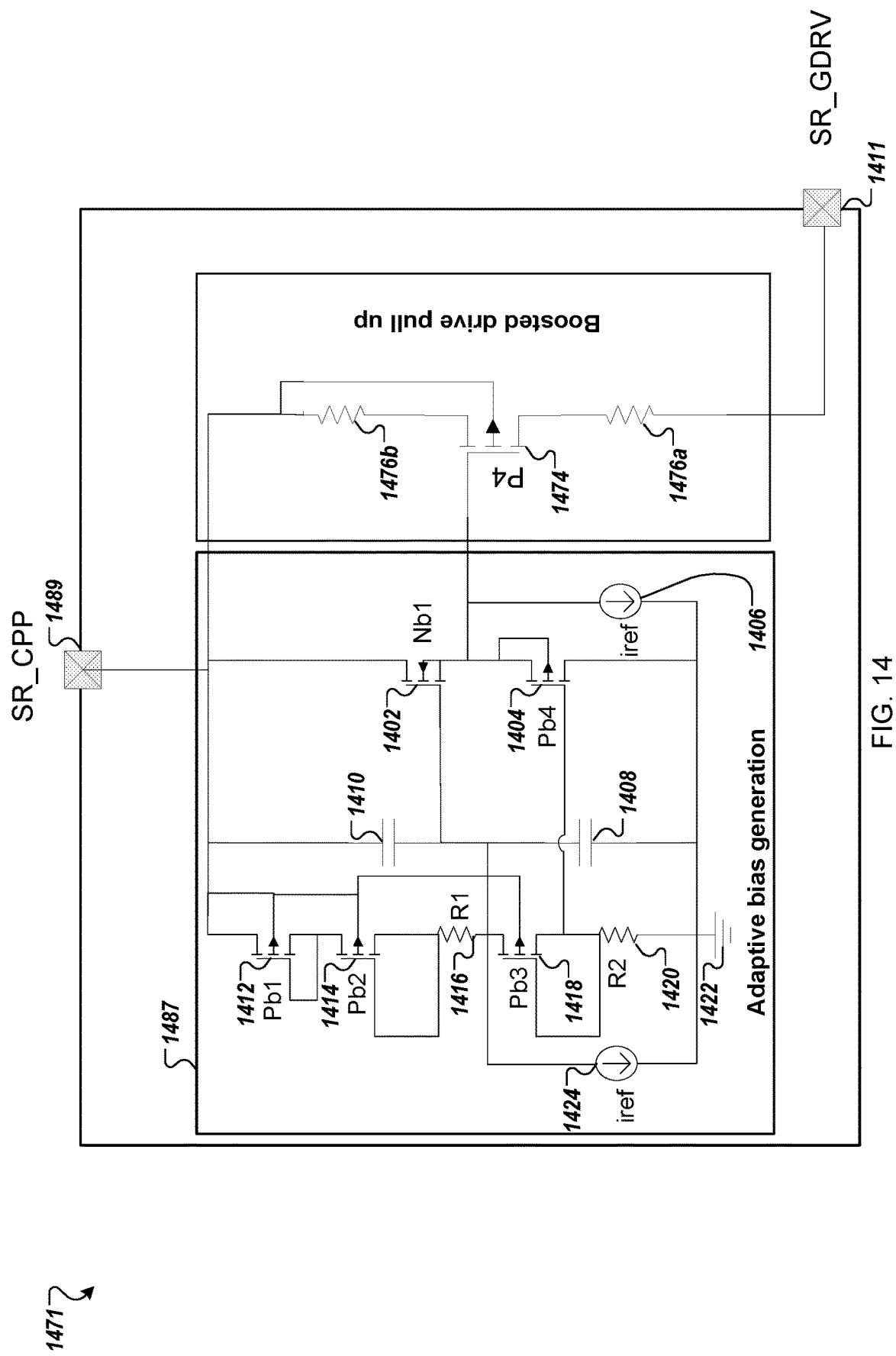
FIG. 14 is a schematic diagram of pull-up path with an adaptive bias controller of an SRGD according to one embodiment.

FIG. 14 is a schematic diagram of pull-up path 1471 with an adaptive bias controller of an SRGD according to one embodiment. Although not all components of the SRGD are shown, the SRGD is similar to the SRGD of FIG. 6, as noted by similar reference numbers. In one embodiment, the pull-up path 1471 may be pull-up path 671 of FIG. 6. In another embodiment, the pull-up path 1471 may be pull-up path 1071 of FIG. 10. In another embodiment, the pull-up path 1471 may be pull-up path 1171 of FIG. 11.

The pull-up path 1471 (boosted drive pull up) includes resistor 1476a coupled between the output 1411 (SR_GDRV) to the gate of the synchronous rectifier FET and switch 1474 (P4). Switch 1474 is coupled to adaptive bias controller 1487 (adaptive bias SR_CPP). Referring back to FIG. 5, the adaptive bias controller 1487 includes phase and drive strength controller 581 and bias generator 585. The adaptive bias controller 1487 is to send control signals to enable or disable (e.g., turn on or turn off) switch 1474. Resistor 1476b is coupled between plate 1489 of a gate capacitor and switch 1474. In one embodiment, the gate capacitor is gate capacitor 190 of FIG. 1. In another embodiment, the gate capacitor is gate capacitor 590 of FIG. 5. In another embodiment, the gate capacitor is gate capacitor 890 of FIG. 8.

The adaptive bias controller 1487 includes switch 1402 coupled to switch 1474 and switch 1404 coupled to switch 1474 and switch 1402. Switch 1402 is coupled to plate 1489 of the gate capacitor. Current 1406 is between switch 1404 and switch 1474. Capacitor 1410 is coupled between switch 1402 and switch 1412. Switch 1414 is coupled to switch 1412. Resistor 1416 is coupled to switch 1414. Switch 1418 is coupled between resistor 1416 and resistor 1420. Resistor 1420 is coupled to a ground potential 1422. Current 1424 is between resistor 1416 and resistor 1420.

Adaptive delay generation, e.g., as described in FIGS. 12A-B and FIG. 13A-B, helps control a section of the SRGD which operates on a supply voltage (Vddd) during a first phase and a fourth phase, as described in reference to FIG. 7. During a second phase and a third phase, as described in reference to FIG. 7, the SRGD works on a boosted supply voltage (e.g., 2*Vddd). The adaptive bias controller 1487 may provide an adaptive biasing scheme to circumvent these issues by tracking the drive strength and reducing peak currents on pull-up paths that are working on the boosted supply voltage. The adaptive biasing scheme may be used for a path from the boosted voltage supply (e.g., plate 1489 of the gate capacitor) to an output 1411 of the SRGD that supplies a voltage on a gate of a synchronous rectifier FET. In one embodiment, the synchronous rectifier FET may be synchronous rectifier FET 112 of FIG. 1. The adaptive bias controller 1487 is configured to generate a bias depending on pull-up switches of the SRGD which are operating on the boosted supply voltage (e.g., depending on the corner and temperature) to adaptively control a drive strength of the boosted pull-up paths, and may help in controlling a gate voltage (e.g., at the output 1411 of the SRGD) to adaptively control a drive strength of the synchronous rectifier FET.

Figure 15A:
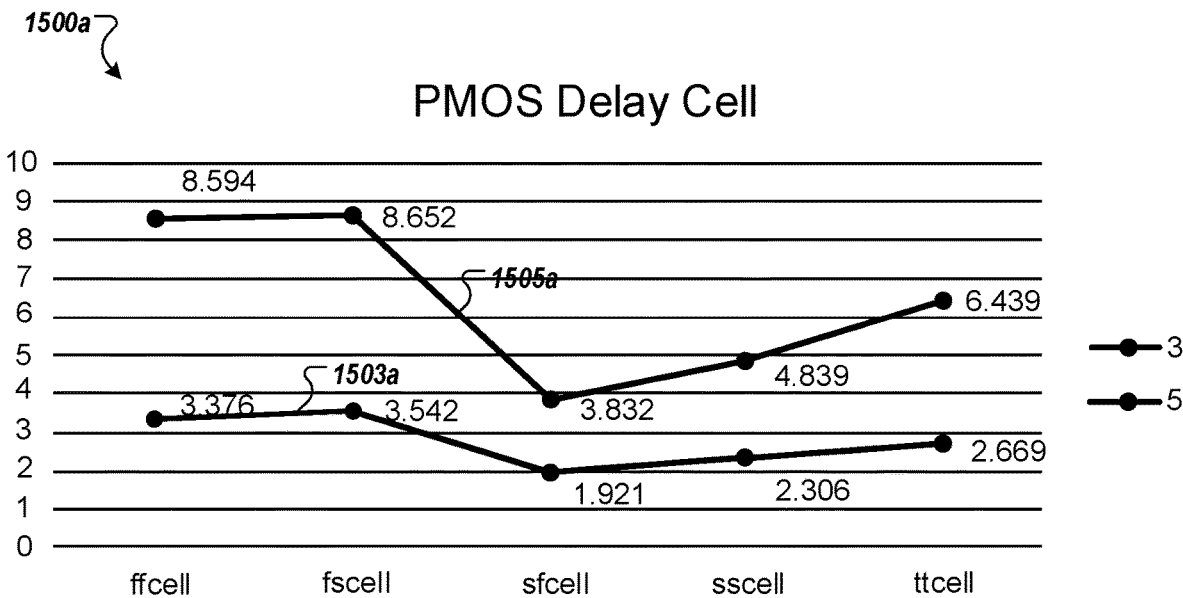
FIG. 15A is a graph showing delay variation of a PMOS delay cell across a synchronous rectifier FET corner used in an adaptive slew control block according to one embodiment.

FIG. 15A is a graph 1500a showing delay variation of a PMOS delay cell across an SRGD pull-up path corner used in an adaptive slew control block according to one embodiment. Horizontal axis labels represent fast PMOS cell and fast NMOS cell, fast PMOS cell and slow NMOS cell, slow PMOS cell and fast NMOS cell, slow PMOS cell and slow NMOS cell, and typical PMOS cell and typical NMOS cell, from left to right. Graph 1503a corresponds to a supply voltage level Vddd of 3V. Graph 1505a corresponds to a supply voltage level Vddd of 5V.

Figure 15B:
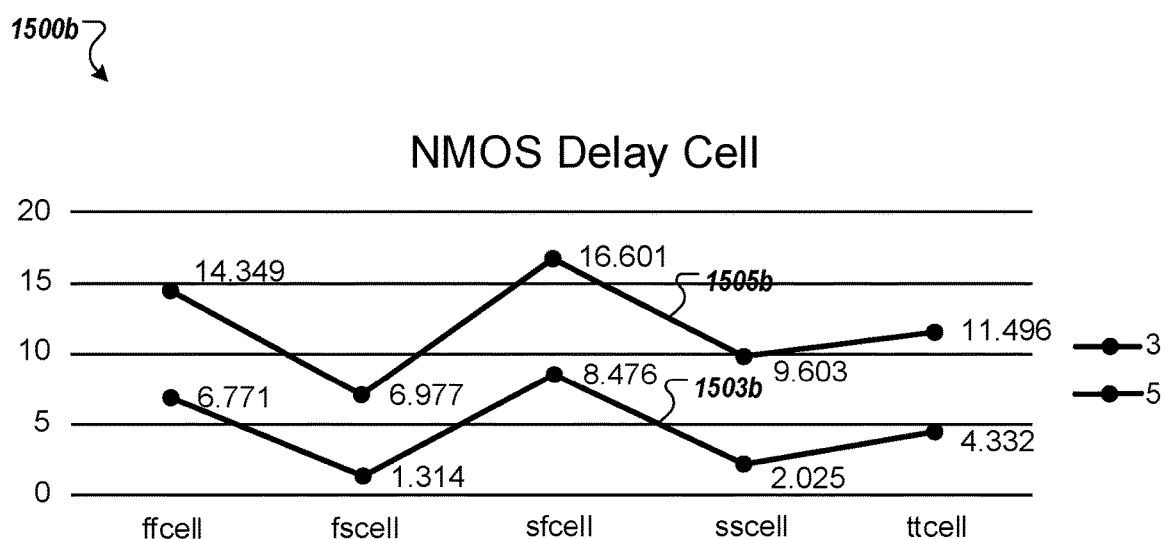
FIG. 15B is a graph showing delay variation of an NMOS delay cell across a synchronous rectifier FET corner used in an adaptive slew control block according to one embodiment.

FIG. 15B is a graph 1500b showing delay variation of an NMOS delay cell across an SRGD pull-down path corner used in an adaptive slew control block according to one embodiment. Horizontal axis labels represent fast PMOS cell and fast NMOS cell, fast PMOS cell and slow NMOS cell, slow PMOS cell and fast NMOS cell, slow PMOS cell and slow NMOS cell, and typical PMOS cell and typical NMOS cell, from left to right. Graph 1503b corresponds to a supply voltage level Vddd of 3V. Graph 1505b corresponds to a supply voltage level Vddd of 5V.

Figure 16:
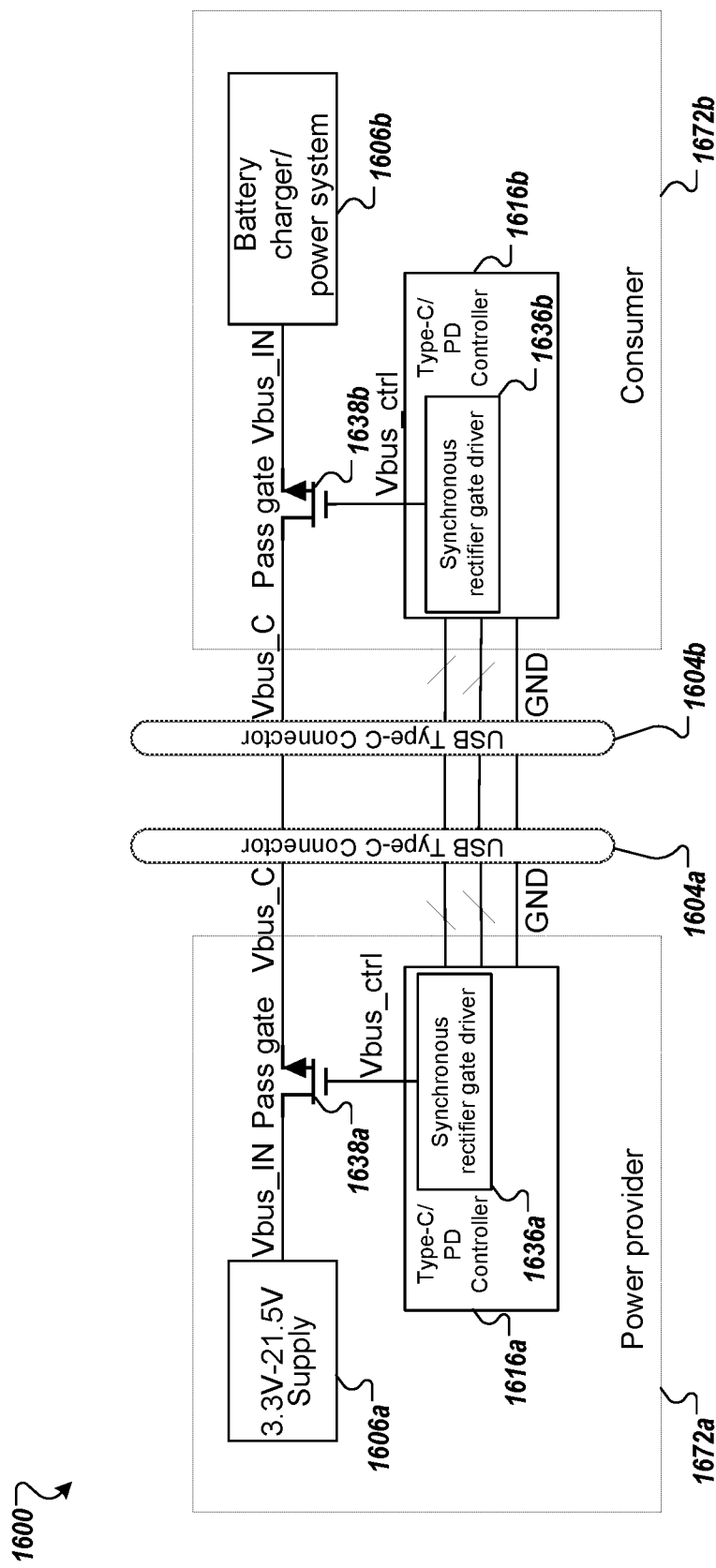
FIG. 16 is a schematic diagram of a USB-PD power adapter with a synchronous rectifier gate driver (SRGD) integrated on a secondary-side controller (also referred to as power adapter secondary IC controller) to deliver power from a power provider device to an attached consumer device according to one embodiment.

FIG. 16 is a schematic diagram of a USB-PD power adapter 1600 with a synchronous rectifier gate driver (SRGD) 1636a integrated on a secondary-side controller 1616a (also referred to as power adapter secondary IC controller) to deliver power from a power provider device 1672a to an attached consumer device 1672b according to one embodiment. When a consumer device 1672b is connected to a power provider 1672a, the provider SRGD 1636a may enable or disable a provider FET 1638a (also a provider nFET, a provider switch, a secondary-side FET) in order to deliver power to the attached consumer device 1672c. For example, the provider secondary gate driver 1636a may enable the provider FET 1638a when power is to be delivered to the attached consumer device 1672b. Alternatively or in addition, the provider secondary gate driver 1636a may disable the provider FET 1638a when power is not to be delivered to the attached consumer device 1672-c.

The consumer device 1672b may be a USB-PD power consumer with a synchronous rectifier gate driver (SRGD)

1636b integrated on a secondary-side controller 1616b of the consumer device, to receive power from an attached power provider device 1672a (e.g., to charge a battery of the consumer device 1672b) in one embodiment. When power provider device 1672a is connected to consumer device 1672b (e.g., serving as a power supply), consumer SRGD 1636b may enable or disable a consumer FET 1638b (e.g., a consumer nFET, a consumer switch) in order to receive power from the attached provider device 1672a. For example, consumer SRGD 1636b may enable consumer FET 1638b when power is to be received from the attached provider device 1672a to charge a battery, in one embodiment. Alternatively or in addition, consumer SRGD 1636b may disable consumer FET 1638b when power is not to be received from the power provider device 1672a.

In another embodiment, consumer device 1672b may be a USB-PD power consumer to receive power from an attached power provider device 1672a (e.g., to charge a battery of consumer device 1672b). When the power provider device 1672a is connected to the consumer device 1672b (e.g., serving as a power supply), the provider SRGD 1636a may enable or disable a provider FET 1638a (e.g., a provider nFET, a provider switch) and a consumer FET 1638b (e.g., a consumer nFET, a consumer switch) such that power provider 1672a is to provider power to consumer device 1672b and consumer device 1672b is to receive power from the attached provider device 1672a. For example, provider SRGD 1636a may enable provider FET 1638a and the consumer FET 1638b when power is to be received from the attached provider device 1672a to charge a battery, in one embodiment. Alternatively, or in addition, provider SRGD 1636b may disable provider FET 1638a and consumer FET 1638b when power is not to be received from power provider device 1672.

Although not all components of consumer SRGD 1636b are not shown, consumer SRGD 1636b is similar to provider SRGD 1636a, as noted by similar reference numbers. The SRGD 1636b includes a boosted voltage generator circuit, a gate driver circuit, and a phase and slew controller circuit. The SRGD 1636b is coupled to gate capacitor (not shown in FIG. 16) and a gate of a synchronous rectifier FET (not shown in FIG. 16). The combination of the boosted voltage generator circuit, the gate driver circuit, and the phase and slew controller circuit is configured to generate the boosted voltage on the gate of the synchronous rectifier FET.

Figure 17:
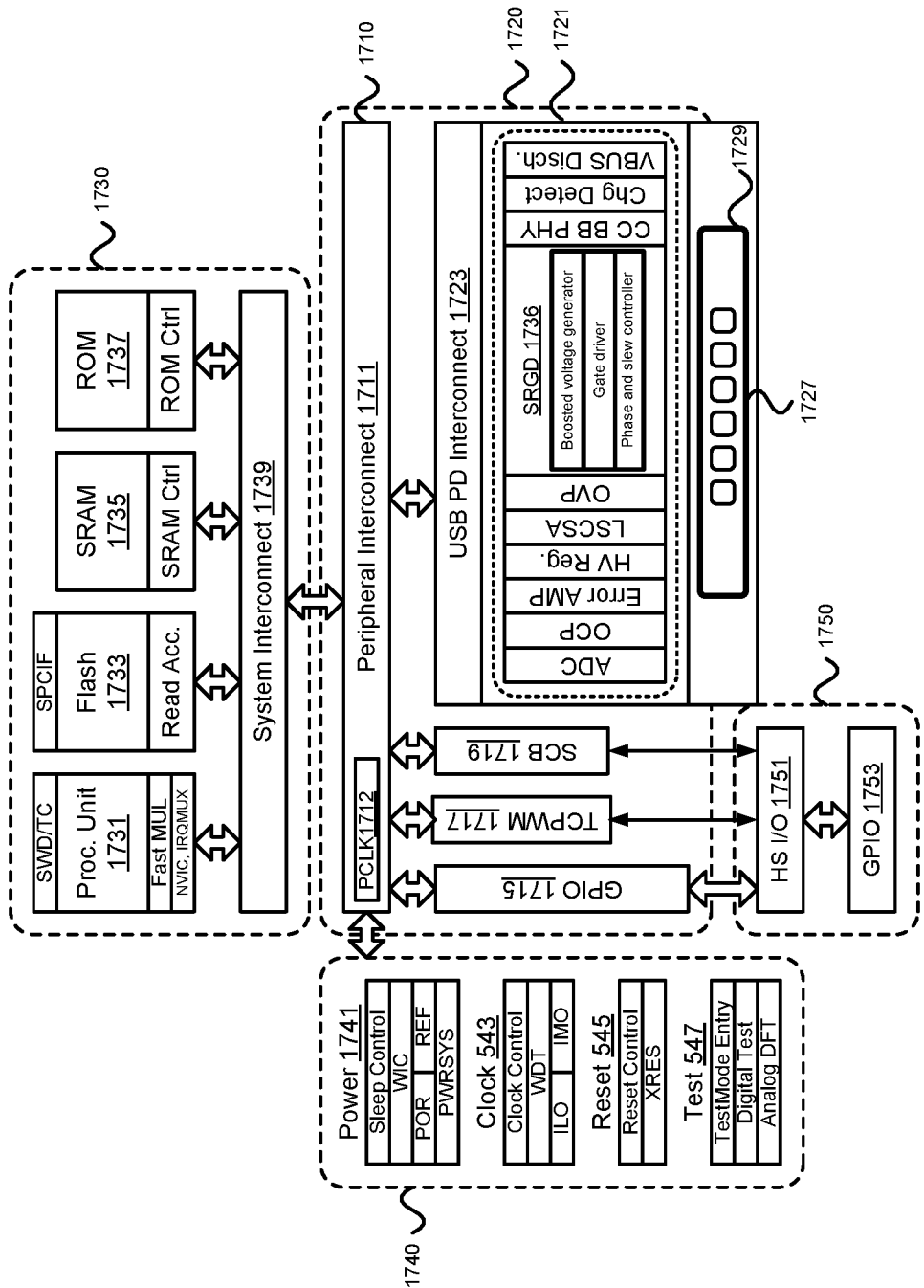
FIG. 17 is a block diagram illustrating a system for a USB device for use in USB power delivery in accordance with some embodiments.

FIG. 17 is a block diagram illustrating a system 1700 for a USB device for use in USB power delivery in accordance with some embodiments. System 1700 may include a peripheral subsystem 1710 including a number of components for use in USB-PD. Peripheral subsystem 1710 may include a peripheral interconnect 1711 including a clocking module, peripheral clock (PCLK) 1712 for providing clock signals to the various components of peripheral subsystem 1710. Peripheral interconnect 1711 may be a peripheral bus, such as a single-level or multi-level advanced high-performance bus (AHB), and may provide a data and control interface between peripheral subsystem 1710, CPU subsystem 1730, and system resources 1740. Peripheral interconnect 1711 may include controller circuits, such as direct memory access (DMA) controllers, which may be programmed to transfer data between peripheral blocks without input by, control of, or burden on CPU subsystem 1730.

The peripheral interconnect 1711 may be used to couple components of peripheral subsystem 1710 to other components of system 1700. Coupled to peripheral interconnect 1711 may be a number of general purpose input/outputs (GPIOs) 1715 for sending and receiving signals. GPIOs 1715 may include circuits configured to implement various functions such as pull-up, pull-down, input threshold select, input and output buffer enabling/disable, single multiplexing, etc. Still other functions may be implemented by GPIOs 1715. One or more timer/counter/pulse-width modulator (TCPWM) 1717 may also be coupled to the peripheral interconnect and include circuitry for implementing timing circuits (timers), counters, pulse-width modulators (PWMs) decoders, and other digital functions that may operate on I/O signals and provide digital signals to system components of system 1700. Peripheral subsystem 1710 may also include one or more serial communication blocks (SCBs) 1719 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 1710 may include a USB power delivery subsystem 1720 coupled to the peripheral interconnect and comprising a set of USB-PD modules 1721 for use in USB power delivery. USB-PD modules 1721 may be coupled to the peripheral interconnect 1711 through a USB-PD interconnect 1723. USB-PD modules 1721 may include an analog-to-digital conversion (ADC) module for converting various analog signals to digital signals; an error amplifier (AMP) for regulating the output voltage on VBUS line per a PD contract; a high-voltage (HV) regulator for converting the power source voltage to a precise voltage (such as 3.5-5V) to power system 1700; a low-side current sense amplifier (LSCSA) for measuring load current accurately, an over voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 1721 may also include a charger detection module for determining that a charging circuit is present and coupled to system 1700 and a VBUS discharge module for controlling discharge of voltage on VBUS. In particular, the one or more gate drivers for external power FETs comprises a synchronous rectifier gate driver (SRGD) integrated on the secondary-side controller to provide a synchronous switching scheme with adaptive slew rate control to adiabatically charge and discharge a gate capacitor and to generate a boosted voltage (e.g., 2*Vddd) at a gate of the synchronous rectifier FET. As described in the present disclosure, the SRGD comprises a boosted voltage generator circuit, a gate driver circuit, and a phase and slew controller circuit. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 1720 may also include pads 1727 for external connections and electrostatic discharge (ESD) protection circuitry 1729, which may be required on a Type-C port. USB-PD modules 1721 may also include a communication module for retrieving and communicating information stored in non-volatile memory one controller with another controller, such as between a primary-side controller and a secondary-side controller of a flyback converter.

GPIO 1715, TCPWM 1717, and SCB 1719 may be coupled to an input/output (I/O) subsystem 1750, which may include a high-speed (HS) I/O matrix 1751 coupled to a number of GPIOs 1753. GPIOs 1715, TCPWM 1717, and SCB 1719 may be coupled to GPIOs 1753 through HS I/O matrix 1751.

System 1700 may also include a central processing unit (CPU) subsystem 1730 for processing commands, storing program information, and data. CPU subsystem 1730 may include one or more processing units 1731 for executing instructions and reading from and writing to memory locations from a number of memories. Processing unit 1731 may be a processor suitable for operation in an integrated circuit (IC) or a system-on-chip (SOC) device. In some embodiments, processing unit 1731 may be optimized for low-power operation with extensive clock gating. In this embodiment, various internal control circuits may be implemented for processing unit operation in various power states. For example, processing unit 1731 may include a wake-up interrupt controller (WIC) configured to wake the processing unit up from a sleep state, allowing power to be switched off when the IC or SOC is in a sleep state. CPU subsystem 1730 may include one or more memories, including a flash memory 1733, and static random access memory (SRAM) 1735, and a read-only memory (ROM) 1737. Flash memory 1733 may be a non-volatile memory (NAND flash, NOR flash, etc.) configured for storing data, programs, and/or other firmware instructions. Flash memory 1733 may include a read accelerator and may improve access times by integration within CPU subsystem 1730. SRAM 1735 may be a volatile memory configured for storing data and firmware instructions accessible by processing unit 1731. ROM 1737 may be configured to store boot-up routines, configuration parameters, and other firmware parameters and settings that do not change during operation of system 1700. SRAM 1735 and ROM 1737 may have associated control circuits. Processing unit 1731 and the memories may be coupled to a system interconnect 1739 to route signals to and from the various components of CPU subsystem 1730 to other blocks or modules of system 1700. System interconnect 1739 may be implemented as a system bus such as a single-level or multi-level AHB. System interconnect 1739 may be configured as an interface to couple the various components of CPU subsystem 1730 to each other. System interconnect 1739 may be coupled to peripheral interconnect 1711 to provide signal paths between the components of CPU subsystem 1730 and peripheral subsystem 1710.

System 1700 may also include a number of system resources 1740, including a power module 1741, a clock module 1743, a reset module 1745, and a test module 1747. Power module 1741 may include a sleep control module, a wake-up interrupt control (WIC) module, a power-on-reset (POR) module, a number of voltage references (REF), and a PWRSYS module. In some embodiments, power module 1741 may include circuits that allow system 1700 to draw and/or provide power from/to external sources at different voltage and/or current levels and to support controller operation in different power states, such as active, low-power, or sleep. In various embodiments, more power states may be implemented as system 1700 throttles back operation to achieve a desired power consumption or output. Clock module 1743 may include a clock control module, a watchdog timer (WDT), an internal low-speed oscillator (ILO), and an internal main oscillator (IMO). Reset module 1745 may include a reset control module and an external reset (XRES) module. Test module 1747 may include a module to control and enter a test mode as well as testing control modules for analog and digital functions (digital test and analog DFT).

System 1700 may be implemented in a monolithic (e.g., single) semiconductor die. In other embodiments, various portions or modules of system 1700 may in implemented on different semiconductor dies. For example, memory modules of CPU subsystem 1730 may be on-chip or separate. In still other embodiments, separate-die circuits may be packaged into a single "chip," or remain separate and disposed on a circuit board (or in a USB cable connector) as separate elements.

System 1700 may be implemented in a number of application contexts to provide USB-PD functionality thereto. In each application context, an IC controller or SOC implementing system 1700 may be disposed and configured in an electronic device (e.g., a USB-enabled device) to perform operations in accordance with the techniques described herein. In one example embodiment, a system 1700 may be disposed and configured in a personal computer (PC) power adapter for a laptop, a notebook computer, etc. In another example embodiment, system 1700 may be disposed and configured in a power adapter (e.g., a wall charger) for a mobile electronic device (e.g., a smartphone, a tablet, etc.). In another example embodiment, system 1700 may be disposed and configured in a wall socket that is configured to provide power over USB Type-A and/or Type-C port(s). In another example embodiment, system 1700 may be disposed and configured in a car charger that is configured to provide power over USB Type-A and/or Type-C port(s). In yet another example embodiment, system 1700 may be disposed and configured in a power bank that can get charged and then provide power to another electronic device over a USB Type-A or Type-C port. In other embodiments, a system like system 1700 may be configured with the power switch gate control circuitry described herein and may be disposed in various other USB-enabled electronic or electro-mechanical devices.

It should be understood that a system, like system 1700 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of system 1700 should be regarded in an illustrative rather than a restrictive sense.

Figure 18:
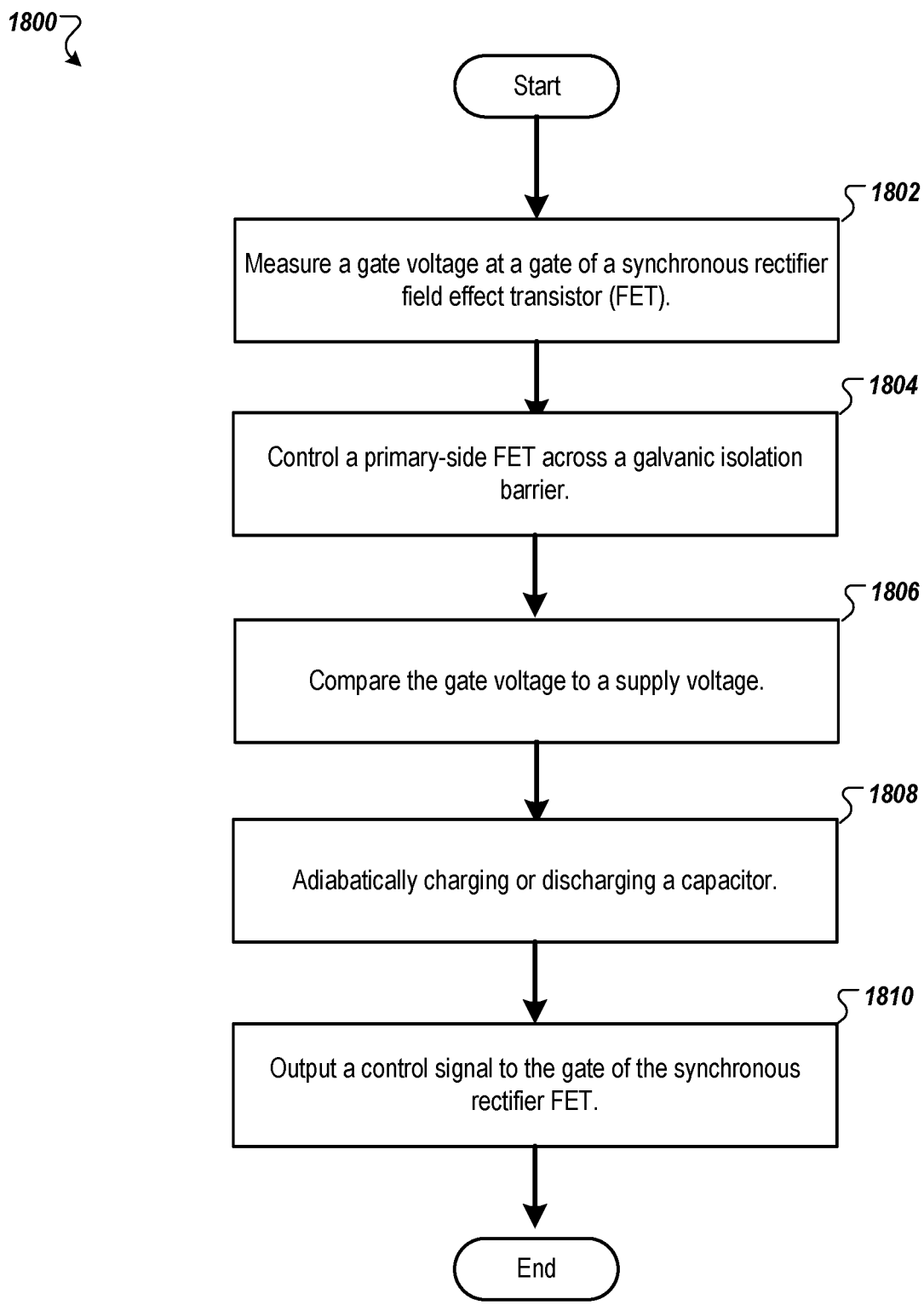
FIG. 18 is a flow diagram of a method of synchronously switching a synchronous rectifier FET by an SRGD with adaptive slew control in order to adiabatically charge and discharge a gate capacitor to recycle charge and generate a boosted voltage on a gate of the synchronous rectifier FET according to one embodiment.

FIG. 18 is a flow diagram of a method 1800 of synchronously switching a synchronous rectifier FET by an SRGD with adaptive slew control in order to adiabatically charge and discharge a gate capacitor to recycle charge and generate a boosted voltage on a gate of the synchronous rectifier FET according to one embodiment. The method 1800 may be performed by processing logic that comprises hardware (e.g., circuitry, dedicated logic, programmable logic, microcode, etc.), software, firmware, or a combination thereof. In one embodiment, an SRGD integrated on a secondary-side controller of an USB-PD power adapter performs the method 1800. In another embodiment, the SRGD 136 of FIG. 1 performs the method 1800. In another embodiment, the SRGD 500 of FIG. 5 performs the method 1800. In another embodiment, the SRGD 600 of FIG. 6 performs the method 1800. In another embodiment, the SRGD 800 of FIG. 8 performs the method 1800. In another embodiment, the SRGD 1000 of FIG. 10 performs the method 1800. In another embodiment, the SRGD 1100 of FIG. 11 performs the method 1800. In another embodiment, the SRGD 1636a of FIG. 16 performs the method 1800. In another embodiment, the SRGD 1636b of FIG. 16 performs the method 1800. In another embodiment, the SRGD 1736 of FIG. 17 performs the method 1800.

Referring to FIG. 18, the method 1800 begins by the processing logic measuring a gate voltage at a gate of a synchronous rectifier FET (block 1802) coupled to an SRGD integrated on a secondary-side controller of a secondary-side controlled alternating current to direct current (AC-DC) converter. The secondary-side controlled AC-DC converter may be an AC-DC power supply an AC-DC power converter. The AC-DC power converter can be a secondary-controlled AC-DC flyback converter with a galvanic isolation barrier. The processing logic controls a primary-side FET across a galvanic isolation barrier of the AC-DC power converter (block 1804). The processing logic compares the gate voltage at the gate of the synchronous rectifier FET to a supply voltage (e.g., Vddd) of the secondary-side controller (block 1806). The processing logic causes the SRGD to adiabatically charge or discharge a gate capacitor depending on a result of comparing the gate voltage to the supply voltage (block 1808). The processing logic outputs a control signal to the gate of the synchronous rectifier FET in order to drive the synchronous rectifier FET (block 1810). One the processing logic outputs the control signal, the method 1800 ends.

In a further embodiment, the gate capacitor is adiabatically charged or discharged in one of four phases. The control signal may further signal to the SRGD the phase to operate in. During a first phase ($\Phi_1$), the SRGD is turned on and the voltage on the gate of the synchronous rectifier FET goes from 0V to Vddd. During the first phase, the voltage on the positive and negative plates of the gate capacitor are not changed. During the second phase ($\Phi_2$), the voltage on the negative plate of the gate capacitor goes from 0V to Vddd, the voltage on the positive plate of the gate capacitor goes from Vddd to 2*Vddd, and the voltage on the gate of the synchronous rectifier FET on the output goes from Vddd to 2*Vddd. During the third phase ($\Phi_3$), the voltage on the positive plate of the gate capacitor from 2*Vddd to Vddd. The gate of the synchronous rectifier FET goes from 2*Vddd to Vddd. The negative plate of the gate capacitor goes from Vddd to 0V. During the fourth phase ($\Phi_4$), the voltage on terminal 611 reaches 0V. The switching cycle may then be repeated.

In another embodiment, the processing logic controls a delay of the control signal in order to control a slew rate of the SRGD. The processing logic provides the control signal to a gate driver circuit of the SRGD so that the gate driver circuit can drive the synchronous rectifier FET using the gate capacitor.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An alternating current to direct current (AC-DC) power supply comprising:
    a synchronous rectifier field effect transistor (FET);
    a transformer of the AC-DC converter, the transformer being coupled to the synchronous rectifier FET; and
    a secondary-side controller coupled to the synchronous rectifier FET, wherein the secondary-side controller is to control a primary-side FET across a galvanic isolation barrier, wherein the secondary-side controller comprises a synchronous rectifier gate driver (SRGD) coupled to a gate of the synchronous rectifier FET, wherein the SRGD is to drive the synchronous rectifier FET using a capacitor and an adaptive slew rate, wherein the capacitor is adiabatically charged and discharged.

2. The AC-DC power supply of claim 1, wherein the secondary-side controller further comprises the capacitor coupled to the SRGD, and wherein the SRGD comprises:
    a voltage generator circuit coupled to a first plate of the capacitor and a second plate of the capacitor;
    a gate driver circuit coupled to the first plate of the capacitor and the gate of the synchronous rectifier FET; and
    a phase and slew rate controller circuit coupled to the voltage generator circuit and coupled to the gate driver circuit.

3. The AC-DC power supply of claim 2, wherein the voltage generator circuit comprises:
    a first pull-up element coupled to the first plate and coupled to a first node at a first voltage level;
    a second pull-up element coupled to the first pull-up element and coupled to the second plate, and further coupled to the first node; and
    a first pull-down element coupled to the second pull-up element, the second plate, and a second node at a second voltage level, wherein the second voltage level is lower than the first voltage level.

4. The AC-DC power supply of claim 2, wherein the gate driver circuit comprises:
    a first pull-up element coupled between the first plate and the gate of the synchronous rectifier FET;
    a second pull-up element coupled between a first node at a first voltage level and the gate of the synchronous rectifier FET and further coupled to the first pull-up element; and
    a first pull-down element coupled to the first pull-up element, the second pull-up element, and the gate of the synchronous rectifier FET, and further coupled to a second node at a second voltage level, wherein the second voltage level is lower than the first voltage level.

5. The AC-DC power supply of claim 2, wherein the phase and slew rate controller comprises a drive strength and slew rate controller, and wherein the voltage generator circuit comprises:
    a first node coupled to the second plate;
    a first pull-down element coupled to the first node;
    a first switch coupled between the first pull-down element, the drive strength and slew rate controller, and further coupled to a second node at a first voltage level;
    a first pull-up element coupled to the first node;
    a second switch coupled between the first pull-up element and the drive strength and slew rate controller;
    a third switch coupled between the drive strength and slew rate controller and a third node, wherein the third node is coupled between the second switch and the third switch, and wherein the third node is at a second voltage level greater than the first voltage level, and is coupled to the gate driver circuit; and
    a fourth switch coupled between a level shifter and a second pull-up element.

6. The AC-DC power supply of claim 5, wherein the phase and slew rate controller comprises an adaptive bias controller, and wherein the gate driver circuit comprises:
    a fourth node coupled to the first plate;
    a fifth switch coupled between a third pull-up element and the adaptive bias controller, wherein the third pull-up element is coupled to the fourth node;
    a fourth pull-up element coupled to the gate of the synchronous rectifier FET, wherein the fifth switch is coupled between the third pull-up element and the fourth pull-up element;
    a sixth switch coupled between the level shifter and a fifth pull-up element, wherein the fifth pull-up element is coupled to the gate of the synchronous rectifier FET;
    a seventh switch coupled between the drive strength and slew rate controller and the third node at the second voltage level; and
    an eighth switch coupled between the drive strength and slew rate controller and the gate of the synchronous rectifier FET and further coupled to the first node at the first voltage level.

7. The AC-DC power supply of claim 2, wherein the phase and slew rate controller circuit comprises a drive strength and slew rate controller, an adaptive bias controller, and a phase and drive strength controller, and is to provide a control signal to control the voltage generator circuit and the gate driver circuit, and the drive strength and slew rate controller is to control a delay of the control signal.

8. The AC-DC power supply of claim 2, wherein the phase and slew rate controller circuit comprises a drive strength and slew rate controller and an adaptive bias controller, and wherein the drive strength and slew rate controller is to control a delay of a control signal to control the gate driver circuit and the adaptive bias controller is to generate a boosted voltage at the gate of the synchronous rectifier FET, wherein the boosted voltage is greater than a supply voltage of the secondary-side controller.

9. The AC-DC power supply of claim 2, wherein the phase and slew rate controller circuit is a control block coupled to the voltage generator circuit and coupled to the gate driver circuit, and is configured to generate a control signal to enable one of a first phase, a second phase, a third phase, or a fourth phase of operation of the SRGD and wherein the phase and slew rate controller is to:
in the first phase:
maintain the second plate of the capacitor at a first voltage level;
maintain the first plate of the capacitor at a second voltage level, higher than the first level; and
charge the gate of the secondary-side FET to the second voltage level;
in the second phase:
charge the second plate of the capacitor to the second voltage level;
charge the first plate of the capacitor to a third voltage level, higher than the second voltage level; and
charge the gate of the secondary-side FET to the third voltage level;
in the third phase:
discharge the second plate of the capacitor to the first voltage level;
discharge the first plate of the capacitor to the second voltage level; and
discharge the gate of the secondary-side FET to the second voltage level; and
in the fourth phase:
maintain the second plate of the capacitor at the first voltage level;
maintain the first plate of the capacitor at the second voltage level; and
discharge the gate of the secondary-side FET to the first voltage level.

10. The AC-DC power supply of claim 2, wherein the phase and slew rate controller comprises a drive strength and slew rate controller comprising:
a current generator to generate a current which is inversely proportional to a drive strength of the synchronous rectifier FET; and
a delay-based slew generator comprising a plurality of current inverters positioned in a cascaded pattern to generate a delay of a control signal based on the current.

11. The AC-DC power supply of claim 2, wherein the phase and slew rate controller comprises an adaptive bias controller comprising:
a comparator to compare a voltage of a control signal to a supply voltage of the secondary-side controller; and
an adaptive bias generator to generate a voltage level on the gate of the synchronous rectifier FET wherein the voltage level is greater than the supply voltage.

12. An alternating current to direct current (AC-DC) power adapter device comprising:
a USB-C connector;
a transformer coupled between AC terminals and DC terminals, the transformer to convert AC power on the AC terminals to DC power on the DC terminals with galvanic isolation between the AC terminals and the DC terminals;
a primary-side controller coupled to the transformer;
a secondary-side controller coupled to the transformer; and
a synchronous rectifier field effect transistor (FET), wherein the secondary-side controller comprises a synchronous rectifier gate driver (SRGD) coupled to a gate of the synchronous rectifier FET, wherein the SRGD is to drive the synchronous rectifier FET using a capacitor and an adaptive slew rate, and wherein the capacitor is adiabatically charged and discharged.

13. The AC-DC power adapter device of claim 12, wherein the secondary-side controller further comprises the capacitor coupled to the SRGD and wherein the SRGD comprises:
a voltage generator circuit coupled to a first plate of the capacitor and a second plate of the capacitor;
a gate driver circuit coupled to the first plate of the capacitor and the gate of the synchronous rectifier FET; and
a phase and slew rate controller circuit coupled to the voltage generator circuit and coupled to the gate driver circuit.

14. The AC-DC power adapter device of claim 13, wherein the voltage generator circuit comprises:
a first pull-up element coupled to the first plate and coupled to a first node at a first voltage level;
a second pull-up element coupled to the first pull-up element and coupled to the second plate, and further coupled to the first node; and
a first pull-down element coupled to the second pull-up element, the second plate, and a second node at a second voltage level, wherein the second voltage level is lower than the first voltage level.

15. The AC-DC power adapter device of claim 13, wherein the gate driver circuit comprises:
a first pull-up element coupled between the first plate and the gate of the synchronous rectifier FET;
a second pull-up element coupled between a first node at a first voltage level and the gate of the synchronous rectifier FET and further coupled to the first pull-up element; and
a first pull-down element coupled to the first pull-up element, the second pull-up element, and the gate of the synchronous rectifier FET, and further coupled to a second node at a second voltage level.

16. The AC-DC power adapter device of claim 13, wherein the phase and slew rate controller circuit comprises a drive strength and slew rate controller, an adaptive bias controller, and a phase and drive strength controller, and wherein the phase and slew rate controller circuit is to provide a control signal to control the voltage generator circuit and the gate driver circuit.

17. The AC-DC power adapter device of claim 13, wherein the phase and slew rate controller circuit is a control block coupled to the voltage generator circuit and coupled to the gate driver circuit, and is configured to generate a control signal to enable one of a first phase, a second phase, a third phase, or a fourth phase of operation of the SRGD and wherein the phase and slew rate controller is to:
in the first phase:
maintain the second plate of the capacitor at a first voltage level;
maintain the first plate of the capacitor at a second voltage level, higher than the first level; and
charge the gate of the secondary-side FET to the second voltage level;
in the second phase:
charge the second plate of the capacitor to the second voltage level;
charge the first plate of the capacitor to a third voltage level, higher than the second voltage level; and
charge the gate of the secondary-side FET to the third voltage level;

in the third phase:
  discharge the second plate of the capacitor to the first voltage level;
  discharge the first plate of the capacitor to the second voltage level; and
  discharge the gate of the secondary-side FET to the second voltage level; and
in the fourth phase:
  maintain the second plate of the capacitor at the first voltage level;
  maintain the first plate of the capacitor at the second voltage level; and
  discharge the gate of the secondary-side FET to the first voltage level.

* * * * *